(12) United States Patent
Kato et al.

(10) Patent No.: US 9,862,373 B2
(45) Date of Patent: Jan. 9, 2018

(54) HYBRID VEHICLE AND CONTROL METHOD FOR HYBRID VEHICLE

(71) Applicant: TOYOTA JIDOSHA KABUSHIKI KAISHA, Toyota-shi, Aichi-ken (JP)

(72) Inventors: Shunya Kato, Seto (JP); Ikuo Ando, Toyota (JP); Naoki Ishikawa, Tokai (JP); Tooru Matsubara, Toyota (JP); Munehiro Katsumata, Toyota (JP); Masaya Sugai, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/450,196

(22) Filed: Mar. 6, 2017

(65) Prior Publication Data
US 2017/0259802 A1    Sep. 14, 2017

(30) Foreign Application Priority Data

Mar. 8, 2016    (JP) .................................. 2016-044456

(51) Int. Cl.
| | | |
|---|---|---|
| *B60W 20/00* | (2016.01) | |
| *B60W 20/10* | (2016.01) | |
| *B60K 6/365* | (2007.10) | |
| *B60W 50/16* | (2012.01) | |

(52) U.S. Cl.
CPC ............. *B60W 20/10* (2013.01); *B60K 6/365* (2013.01); *B60W 50/16* (2013.01)

(58) Field of Classification Search
CPC ....... B60W 10/06; B60W 10/08; B60W 20/10

USPC ............................ 180/65.265, 65.28, 65.285
See application file for complete search history.

(56) References Cited

U.S. PATENT DOCUMENTS

| | | | | |
|---|---|---|---|---|
| 2006/0161328 | A1* | 7/2006 | Hoshiba ................ | B60W 20/13 701/84 |
| 2008/0289889 | A1* | 11/2008 | Hashimoto ............ | B60K 6/445 180/65.265 |
| 2014/0005867 | A1 | 1/2014 | Wang et al. | |
| 2014/0081499 | A1* | 3/2014 | Ito .......................... | B60K 6/445 701/22 |
| 2014/0081500 | A1* | 3/2014 | Ito ......................... | B60W 20/13 701/22 |
| 2014/0350761 | A1* | 11/2014 | Endo ..................... | B60W 20/00 701/22 |

(Continued)

FOREIGN PATENT DOCUMENTS

| | | |
|---|---|---|
| JP | 2013-103578 A | 5/2013 |
| JP | 2014-144659 | 8/2014 |
| WO | WO 2015/107381 A1 | 7/2015 |

*Primary Examiner* — Jeffrey J Restifo
(74) *Attorney, Agent, or Firm* — Finnegan, Henderson, Farabow, Garrett & Dunner, LLP

(57) ABSTRACT

An electronic control unit sets a drivability target engine speed, sets upper limit engine power on the basis of the drivability target engine speed, and sets upper limit drive power by dividing the upper limit engine power by a rotational speed of a driveshaft. Then, the electronic control unit compares accelerator requested drive power with the upper limit drive power, sets target engine power such that lower one of the accelerator requested drive power and the upper limit drive power is output to the driveshaft, and controls an engine, a first motor, and a second motor such that the target engine power is output from the engine. In this way, a driver can receive further favorable drive feeling.

10 Claims, 12 Drawing Sheets

(56) References Cited

U.S. PATENT DOCUMENTS

| | | | |
|---|---|---|---|
| 2016/0075322 A1* | 3/2016 | Saito | B60W 20/10 |
| | | | 701/22 |
| 2016/0121707 A1* | 5/2016 | Yamamoto | F16H 57/0413 |
| | | | 180/65.22 |
| 2016/0152225 A1* | 6/2016 | Aoki | B60W 20/13 |
| | | | 701/22 |
| 2016/0325733 A1* | 11/2016 | Baba | B60K 6/445 |
| 2016/0325747 A1* | 11/2016 | Tsuruta | B60W 10/08 |
| 2017/0021822 A1* | 1/2017 | Endo | B60K 6/365 |
| 2017/0066433 A1* | 3/2017 | Muta | B60K 6/387 |
| 2017/0066434 A1* | 3/2017 | Kato | B60W 20/14 |
| 2017/0129478 A1* | 5/2017 | Minegishi | B60W 20/50 |
| 2017/0232951 A1* | 8/2017 | Nawata | B60W 20/10 |

* cited by examiner

HYBRID VEHICLE AND CONTROL METHOD FOR HYBRID VEHICLE

INCORPORATION BY REFERENCE

The disclosure of Japanese Patent Application No. 2016-044456 filed on Mar. 8, 2016 including the specification, drawings and abstract is incorporated herein by reference in its entirety.

BACKGROUND

1. Technical Field

The disclosure relates to a hybrid vehicle and a control method for a hybrid vehicle.

2. Description of Related Art

A hybrid vehicle in which three rotation elements of a planetary gear mechanism are respectively connected to an engine, a first motor, and a second motor, in which the rotation element, to which the second motor is connected, is connected to a driveshaft via a stepped transmission, and in which the driveshaft is coupled to wheels has conventionally been proposed (for example, see Japanese Patent Application Publication No. 2014-144659 (JP 2014-144659 A)). Driving of the hybrid vehicle is basically controlled as follows. First, requested drive power is set on the basis of an accelerator pedal operation amount by a driver and a vehicle speed. Requested power that should be output from the engine is computed by multiplying the requested drive power by a rotational speed of the driveshaft. Next, a target speed of the engine is set on the basis of the requested power and an operation line of the engine on which fuel economy becomes optimum (a fuel economy optimum operation line). Then, the engine, the first motor, the second motor, and the stepped transmission are controlled so as to travel while the engine rotates at the target speed to output the requested power and the requested drive power is output to the driveshaft.

SUMMARY

An operation point of the engine can freely be set in the above-described hybrid vehicle regardless of a gear stage of the stepped transmission. For this reason, there is a case where a change in an engine speed does not match a change in the vehicle speed. When the driver depresses the accelerator pedal, the requested power to the engine is increased. Accordingly, the engine speed is rapidly increased; however, the vehicle speed is not rapidly increased. Thus, only the engine speed is rapidly increased prior to an increase in the vehicle speed. The driver usually obtains such drive feeling that the engine speed is increased along with the increase in the vehicle speed. Thus, when only the engine speed is rapidly increased prior to the increase in the vehicle speed, the driver receives a sense of discomfort in terms of his/her drive feeling. Meanwhile, there is also a case where the engine speed is not changed even when the gear stage of the stepped transmission is changed. When the driver depresses the accelerator pedal and the vehicle speed is increased, the stepped transmission is upshifted along with this. However, when the requested power to the engine is not changed before and after an upshift, the engine is operated while the engine speed remains the same. The driver usually has such gear change feeling that the engine speed is reduced by the upshift of the stepped transmission. In this case, the driver feels the sense of discomfort because the driver cannot receive such gear change feeling. A problem as described above is also applied to a case where the gear stage is virtually shifted in the hybrid vehicle of a type that does not include the stepped transmission.

The disclosure provides a hybrid vehicle and a control method for a hybrid vehicle capable of providing a driver with further favorable drive feeling.

A first aspect of the disclosure is a hybrid vehicle. The hybrid vehicle includes an engine, a first motor, a driveshaft, a planetary gear mechanism, a second motor, a battery, and an electronic control unit. The driveshaft is coupled to an axle. The planetary gear mechanism includes three rotation elements, the three rotation elements are respectively connected to three shafts of an output shaft of the engine, a rotational shaft of the first motor, and the driveshaft. The second motor is configured to input to the driveshaft and output power from the driveshaft. The battery is configured to supply electric power to the first motor and the second motor. The electronic control unit is configured to set drive power that is output to the driveshaft based on an accelerator pedal operation amount by a driver and a vehicle speed as requested drive power. In addition, the electronic control unit is configured to control the engine, the first motor, and the second motor so as to travel by using the requested drive power. Furthermore, the electronic control unit is configured to set a drivability speed, the drivability speed is a speed of the engine that is based on the accelerator pedal operation amount, the vehicle speed, and a gear stage. Moreover, the electronic control unit is configured to set upper limit power of the engine, the upper limit power is maximum power that is output from the engine when the engine is operated at the drivability speed. The electronic control unit is configured to set upper limit drive power of the driveshaft, the upper limit drive power is drive power when the upper limit power is output to the driveshaft. The electronic control unit is configured to set target engine power of the engine, the target engine power is power for outputting one of first power and second power to the driveshaft. The first power is lower one of the upper limit drive power and the requested drive power. The second power is lower one of third power and forth power. The third power is power for outputting the upper limit drive power to the driveshaft. The forth power being power for outputting the requested drive power to the driveshaft. The electronic control unit is configured to control the engine, the first motor, and the second motor such that the target engine power is output from the engine.

In the configuration, the electronic control unit sets the target engine power that corresponds to the gear stage, and controls the engine, the first motor, and the second motor such that the target engine power is output from the engine. Accordingly, even when the driver depresses an accelerator pedal, the engine speed that corresponds to the vehicle speed can be set, and thus the driver can receive further favorable drive feeling when compared to a case where the engine speed is rapidly increased prior to an increase in the vehicle speed. In addition, when the gear stage is changed (shifted), the target engine power that corresponds to the gear stage is changed. Thus, the driver can receive gear change feeling. As a result of these, the driver can receive the further favorable drive feeling.

In the hybrid vehicle, the electronic control unit may control the engine, the first motor, and the second motor such that the first power is output to the driveshaft. In this way, the hybrid vehicle can travel while the drive power that is suited for the target engine power is output to the driveshaft.

In the hybrid vehicle, the electronic control unit may set a target speed of the engine, the target speed is set as the drivability speed. The electronic control unit may control the engine to be operated at the target speed. In this way, the engine can be operated at the drivability speed, for which the gear stage is taken into consideration.

In the hybrid vehicle, the electronic control unit may set the lower one of a fuel economy optimum engine speed and the drivability speed as the target speed of the engine when the gear stage is equal to or higher than a threshold, and may control the engine to be operated at the target speed. Note that the fuel economy optimum engine speed is a speed that is output fifth power from the engine as the fuel economy optimum, the fifth power is power that is based on the requested drive power and the vehicle speed. That is, when the gear stage is equal to or higher than the threshold, the fuel economy optimum engine speed is limited by the drivability speed, for which the gear stage is taken into consideration. Here, as the threshold, a highest gear stage, a lower gear stage than the highest gear stage, such as a one step lower gear stage or a two steps lower gear stage, or the like can be used. In the case where the hybrid vehicle cruises at a relatively high vehicle speed with the gear stage being the high gear stage of the threshold or higher, for example, the highest gear stage, the significantly high power is not required for the travel. Thus, the fuel economy optimum engine speed possibly becomes lower than the drivability speed. In this case, the fuel economy optimum engine speed is set as the target speed. In this way, the fuel economy can be favorable. On the other hand, when the fuel economy optimum engine speed is higher than the drivability speed, the drivability speed is set as the target speed. Thus, the engine can be operated at the speed that corresponds to the gear stage. In this way, the engine can be avoided from being operated at the high speed in such a degree that the driver receives a sense of discomfort while the fuel economy is taken into consideration.

In the hybrid vehicle, the electronic control unit may set power that is obtained by adding charging and discharging requested power to the maximum power as the upper limit power when the charging and discharging requested power is required. In addition, the electronic control unit may set power that is obtained by subtracting the charging and discharging requested power from the upper limit power as the target engine power when the target engine power is set such that the upper limit drive power is output to the driveshaft and the charging and discharging requested power is required. Furthermore, the electronic control unit may set power that is obtained by subtracting the charging and discharging requested power from power for outputting the requested drive power to the driveshaft, as the target engine power when the target engine power is set such that the requested drive power is output to the driveshaft and the charging and discharging requested power is required. Note that the charging and discharging requested power is power to charge and discharge the battery and is power that has a negative value on a charging side. In this way, the engine speed can be suppressed from being increased on the basis of charging and discharging of the battery.

In the hybrid vehicle, the electronic control unit may set the drive power at a time when the power that is obtained by adding charging and discharging requested power to the upper limit power is output to the driveshaft as the upper limit drive power when the charging and discharging requested power is requested. In addition, the electronic control unit may set the upper limit power as the target engine power when the target engine power is set such that the upper limit drive power is output to the driveshaft and when the charging and discharging requested power is requested. Furthermore, the electronic control unit may set power that is obtained by subtracting the charging and discharging requested power from power for outputting the requested drive power to the driveshaft, as the target engine power when the target engine power is set such that the requested drive power is output to the driveshaft and when the charging and discharging requested power is requested. Note that the charging and discharging requested power is power to charge/discharge the battery and is power that has a negative value on a charging side. In this way, the engine speed can be suppressed from being increased on the basis of charging and discharging of the battery.

The hybrid vehicle may include a mode switching switch that is configured to instruct whether to select a drive feeling prioritized mode in which drive feeling of the driver is prioritized over the fuel economy. The electronic control unit may set power of the engine for outputting the requested drive power to the driveshaft, as the target engine power when the drive feeling prioritized mode is not selected by the mode switching switch. In addition, the electronic control unit may control the engine such that the engine is operated at the fuel economy optimum engine speed and the target engine power is output from the engine. The fuel economy optimum engine speed is an engine speed at which the target engine power realizing the optimum fuel economy is output from the engine. In this way, when the drive feeling prioritized mode is selected, the hybrid vehicle can travel while the driver receives the further favorable drive feeling. When the drive feeling prioritized mode is not selected, the hybrid vehicle can travel while realizing the further favorable fuel economy.

In the hybrid vehicle, the gear stage may be a virtual gear stage that is set based on the accelerator pedal operation amount by the driver and the vehicle speed. In addition, the hybrid vehicle may include a stepped transmission that is attached between the driveshaft and the planetary gear mechanism, and the gear stage is either one of a gear stage of the stepped transmission and a gear stage that is obtained by adding a virtual gear stage set based on the accelerator pedal operation amount by the driver and the vehicle speed to the gear stage of the stepped transmission. Here, the "gear stage that is obtained by adding the virtual gear stage to the gear stage of the stepped transmission" means gear stage that is obtained by combining the gear stage of the stepped transmission and the virtual gear stage. For example, a total of four gear stages are provided when two virtual gear stages are respectively added to each of two gear stages of the stepped transmission. A total of eight gear stages are provided when two virtual gear stages are respectively added to each of four gear stages of the stepped transmission. In this way, the desired number of the gear stages can be used.

A second aspect of the disclosure is a control method for a hybrid vehicle. The hybrid vehicle includes an engine, a first motor, a driveshaft, a planetary gear mechanism, a second motor, a battery, and an electronic control unit. The driveshaft is coupled to an axle. The planetary gear mechanism includes three rotation elements, the three rotation elements are respectively connected to three shafts of an output shaft of the engine, a rotational shaft of the first motor, and the driveshaft. The second motor is configured to input power to the driveshaft and output power from the driveshaft. The battery is configured to supply electric power to the first motor and the second motor. The control method includes: setting, by the electronic control unit, drive power that is output to the driveshaft based on an accelerator pedal operation amount by a driver and a vehicle speed as requested drive power; controlling, by the electronic control unit, the engine, the first motor, and the second motor so as to travel by using the requested drive power; setting, by the electronic control unit, a drivability speed, the drivability speed being a speed of the engine that is based on the accelerator pedal operation amount, the vehicle speed, and a gear stage; setting, by the electronic control unit, upper limit power of the engine, the upper limit power being maximum power that is output from the engine when the engine is operated at the drivability speed; setting, by the electronic control unit, upper limit drive power of the driveshaft, the upper limit drive power being drive power when the upper limit power is output to the driveshaft; setting, by the electronic control unit, target engine power of the engine, the target engine power being power for outputting one of first power and second power to the driveshaft, the first power be lower one of the upper limit drive power and the requested drive power, the second power being lower one of third power and forth power, the third power being power for outputting the upper limit drive power to the driveshaft, the forth power being power for outputting the requested drive power to the driveshaft; controlling, by the electronic control unit, the engine, the first motor, and the second motor by the electronic control unit such that the target engine power is output from the engine.

In the configuration, the electronic control unit sets the target engine power that corresponds to the gear stage, and controls the engine, the first motor, and the second motor such that the target engine power is output from the engine. Accordingly, even when the driver depresses the accelerator pedal, the engine speed that corresponds to the vehicle speed can be set, and thus the driver can receive the further favorable drive feeling when compared to the case where the engine speed is rapidly increased prior to the increase in the vehicle speed. In addition, when the gear stage is changed (shifted), the target engine power that corresponds to the gear stage is changed. Thus, the driver can receive the gear change feeling. As the result of these, the driver can receive the further favorable drive feeling.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, a description will be made on a mode for carrying out the disclosure by using examples.

Figure 1:
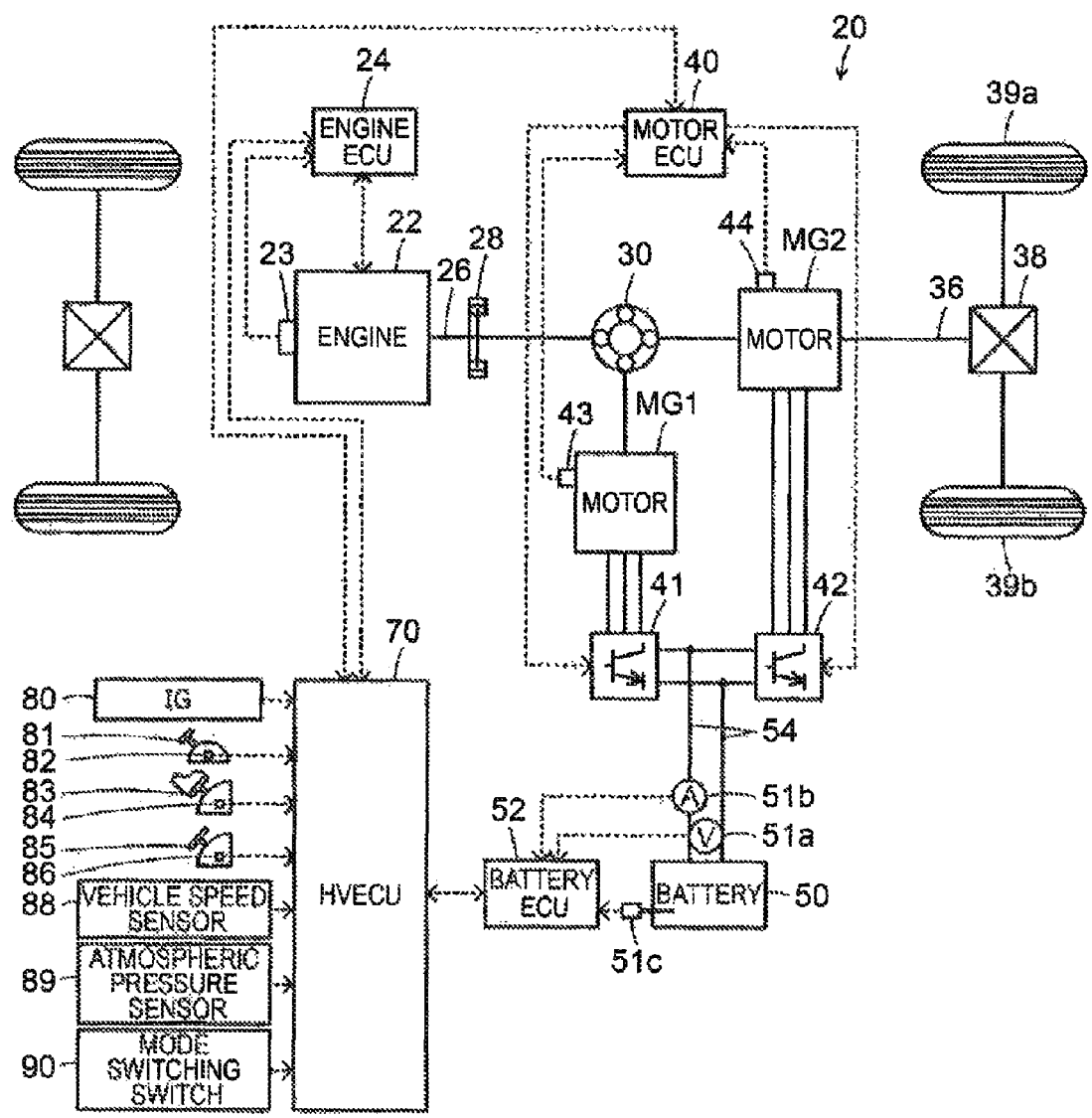
FIG. 1 is a configuration diagram that schematically shows a configuration of a hybrid vehicle 20 in a first example.

FIG. 1 is a configuration diagram that schematically shows a configuration of a hybrid vehicle 20 in a first example of the disclosure. As shown in the drawing, the hybrid vehicle 20 of the first example includes an engine 22, a planetary gear 30, motors MG1, MG2, inverters 41, 42, a battery 50, and a hybrid electronic control unit (hereinafter referred to as an "HVECU") 70.

The engine 22 is configured as an internal combustion engine that uses gasoline, diesel fuel, or the like to output power. An operation of the engine 22 is controlled by an engine electronic control unit (hereinafter referred to as an "engine ECU") 24.

Although not shown, the engine ECU 24 is configured as a microprocessor that has a CPU as a central component, and includes a ROM that stores a processing program, a RAM that temporarily stores data, input/output ports, and a communication port in addition to the CPU. The engine ECU 24 receives signals from various sensors through the input port, and the signals are required to control the operation of the engine 22. As the signals received by the engine ECU 24, for example, a crank angle $\theta cr$ from a crank position sensor 23 that detects a rotation position of a crankshaft 26 of the engine 22, a throttle opening degree TH from a throttle valve position sensor that detects a position of a throttle valve, and the like can be raised. The engine ECU 24 outputs various control signals via the output port, and the various control signals are used to control the operation of the engine 22. As the signals output from the engine ECU 24, for example, a drive control signal to a throttle motor that adjusts the position of the throttle valve, a drive control signal to a fuel injection valve, a drive control signal to an ignition coil that is integrated with an igniter, and the like can be raised. The engine ECU 24 is connected to the HVECU 70 via the communication port, controls the operation of the engine 22 by a control signal from the HVECU 70, and outputs data on an operation state of the engine 22 to the HVECU 70 upon necessary. The engine ECU 24 calculates a rotational speed of the crankshaft 26, that is, a speed Ne of the engine 22 on the basis of the crank angle $\theta cr$ from the crank position sensor 23.

The planetary gear 30 is configured as a planetary gear mechanism of a single pinion type. A rotor of the motor MG1 is connected to a sun gear of the planetary gear 30. A driveshaft 36 that is coupled to drive wheels 39a, 39b via a differential gear 38 is connected to a ring gear of the planetary gear 30. The crankshaft 26 of the engine 22 is connected to a carrier of the planetary gear 30 via a damper 28.

The motor MG1 is configured as a synchronous generator motor, for example. As described above, the rotor thereof is connected to the sun gear of the planetary gear 30. The motor MG2 is configured as a synchronous generator motor, for example. A rotor thereof is connected to the driveshaft 36. The inverters 41, 42 are connected to the battery 50 via electric power lines 54. The motors MG1, MG2 are rotationally driven when plural unillustrated switching elements of the inverters 41, 42 are subjected to switching control by a motor electronic control unit (hereinafter referred to as a "motor ECU") 40.

Although not shown, the motor ECU 40 is configured as a microprocessor that has a CPU as a central component, and includes a ROM that stores a processing program, a RAM that temporarily stores data, input/output ports, and a communication port in addition to the CPU. The motor ECU 40 receives signals from various sensors via the input port, and the signals are required to control driving of the motors MG1, MG2. As the signals received by the motor ECU 40, for example, rotation positions θm1, θm2 from rotation position detection sensors 43, 44 that respectively detect rotation positions of the rotors of the motors MG1, MG2, phase currents from a current sensor that detects a current flowing through each phase of the motors MG1, MG2, and the like can be raised. The motor ECU 40 outputs a switching control signal to each of the unillustrated switching elements of the inverters 41, 42, and the like via the output port. The motor ECU 40 is connected to the HVECU 70 via the communication port, controls driving of the motors MG1, MG2 by the control signal from the HVECU 70, and outputs data on drive states of the motors MG1, MG2 to the HVECU 70 upon necessary. The motor ECU 40 calculates rotational speeds Nm1, Nm2 of the motors MG1, MG2 on the basis of the rotation positions θm1, θm2 of the rotors of the motors MG1, MG2 from the rotation position detection sensors 43, 44.

The battery 50 is configured as a lithium-ion secondary battery or a nickel hydrogen secondary battery, for example. The battery 50 is connected to the inverters 41, 42 via the electric power lines 54. This battery 50 is managed by a battery electronic control unit (hereinafter referred to as a "battery ECU") 52.

Although not shown, the battery ECU 52 is configured as a microprocessor that has a CPU as a central component, and includes a ROM that stores a processing program, a RAM that temporarily stores data, input/output ports, and a communication port in addition to the CPU. The battery ECU 52 receives signals from various sensors via the input port, and the signals are required to manage the battery 50. As the signals that are received by the battery ECU 52, for example, a battery voltage Vb from a voltage sensor 51a that is mounted between terminals of the battery 50, a battery current Ib from a current sensor 51b that is attached to the output terminal of the battery 50, a battery temperature Tb from a temperature sensor 51c that is attached to the battery 50, and the like can be raised. The battery ECU 52 is connected to the HVECU 70 via the communication port and outputs data on a state of the battery 50 to the HVECU 70 upon necessary. The battery ECU 52 calculates a state of charge SOC on the basis of an integrated value of the battery current Ib from the current sensor 51b. The state of charge SOC is a ratio of electric power capacity that can be discharged from the battery 50 to full capacity of the battery 50.

Although not shown, the HVECU 70 is configured as a microprocessor that has a CPU as a central component, and includes a ROM that stores a processing program, a RAM that temporarily stores data, input/output ports, and a communication port in addition to the CPU. The HVECU 70 receives signals from various sensors via the input port. As the signals received by the HVECU 70, for example, an ignition signal from an ignition switch 80, a shift position SP from a shift position sensor 82 that detects an operation position of a shift lever 81, an accelerator pedal operation amount Acc from an accelerator pedal position sensor 84 that detects a depression amount of an accelerator pedal 83, a brake pedal position BP from a brake pedal position sensor 86 that detects a depression amount of a brake pedal 85, and the like can be raised. In addition, a vehicle speed V from a vehicle speed sensor 88, atmospheric pressure Pa from an atmospheric pressure sensor 89, a mode switching control signal from a mode switching switch 90, and the like can be raised. As described above, the HVECU 70 is connected to the engine ECU 24, the motor ECU 40, and the battery ECU 52 via the communication port and exchanges the various control signals and the data with the engine ECU 24, the motor ECU 40, and the battery ECU 52.

Here, as the shift positions SP, a parking position (P position), a reverse travel position (R position), a neutral position (N position), a forward travel position (D position), a manual position (M position), and the like are provided. An upshift position (+ position) and a downshift position (− position) are provided on a side of the manual position (M position). When the manual position (M position) is selected as the shift position SP, driving of the engine 22 is controlled such that the engine 22 is connected to the driveshaft 36 via a virtual six-speed automatic transmission. The mode switching switch 90 is a switch that selects a travel mode that includes a drive feeling prioritized mode and a normal drive mode. In the drive feeling prioritized mode, a driver's drive feeling (drivability drive feeling) is prioritized although slightly degraded fuel economy is associated therewith. In the normal drive mode, the fuel economy is prioritized. In the cases where the normal drive mode is selected and the shift position SP is the forward travel position (D position), driving of the engine 22 and the motors MG1, MG2 is controlled such that silence and the fuel economy are balanced. In the cases where the drive feeling prioritized mode is selected and the shift position SP is the forward travel position (D position), driving of the engine 22 is controlled such that the engine 22 is connected to the driveshaft 36 via the virtual six-speed automatic transmission.

The hybrid vehicle 20 of the first example that is configured as described above travels in any of plural travel modes that include a hybrid travel (HV travel) mode and an electric travel (EV travel) mode. Here, the HV travel mode is a mode in which the vehicle travels by using power from the engine 22 and power from the motors MG1, MG2 while the engine 22 is operated. The EV travel mode is a mode in which the vehicle travels by using the power from the motor MG2 while the engine 22 is not operated.

Figure 2:
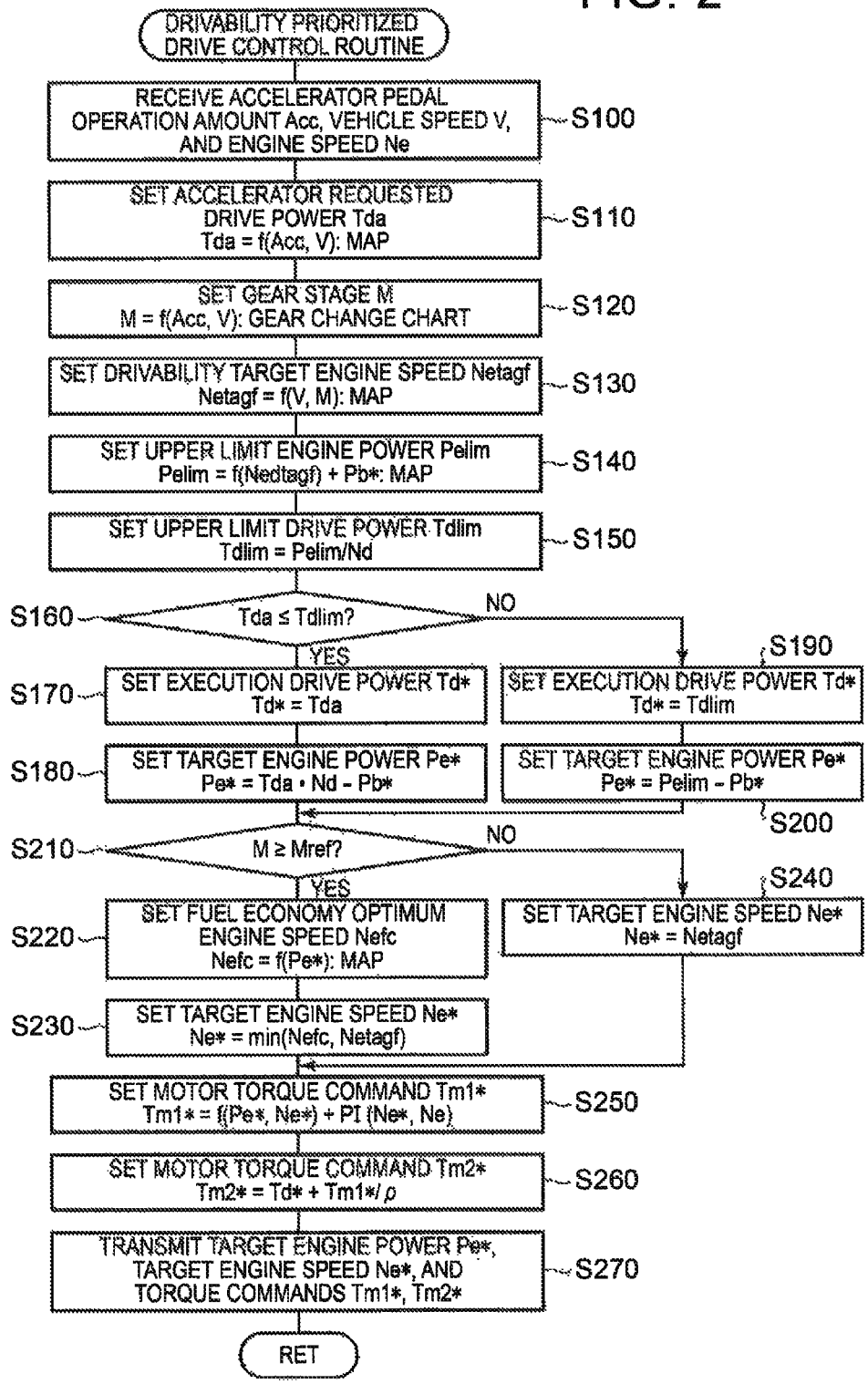
FIG. 2 is a flowchart of one example of a drivability prioritized drive control routine that is executed by an HVECU 70 at a time of a D position in a drive feeling prioritized mode.

Next, a description will be made on an operation of the hybrid vehicle 20 that is configured as described above, in particular, the operation thereof at a time when the drive feeling prioritized mode is selected by the mode switching switch 90. FIG. 2 is a flowchart of one example of a drivability prioritized drive control routine that is executed by the HVECU 70 at a time when the drive feeling prioritized mode is selected and the shift position SP is the forward travel position (D position). The routine is repeatedly executed at specified time intervals (for example, every several msecs). Prior to explanation of drive control at the time of the drive feeling prioritized mode and the D position by using the drivability prioritized drive control routine in FIG. 2, a description will be made on drive control at the time of the normal mode and the D position (drive control at the time of the HV travel mode) for ease of explanation.

In the normal drive mode, when the vehicle travels in the HV travel mode, the drive control is executed by the HVECU 70 as follows. The HVECU 70 first calculates accelerator requested drive power Tda that is requested for the travel (requested to the driveshaft 36) on the basis of the accelerator pedal operation amount Acc and the vehicle speed V and sets the accelerator requested drive power Tda as execution drive power Td*. The accelerator requested drive power Tda can be calculated from an accelerator requested drive power setting map that is exemplified in FIG. 3, for example. Next, travel requested power Pedrv that is requested for the travel is calculated by multiplying the set execution drive power Td* by a rotational speed Nd of the driveshaft 36. Here, as the rotational speed Nd of the driveshaft 36, a rotational speed that is obtained by multiplying the rotational speed Nm2 of the motor MG2 by a conversion coefficient km, a rotational speed that is obtained by multiplying the vehicle speed V by a conversion coefficient kv, or the like can be used. Then, the HVECU 70 sets charge/discharge requested power Pb* of the battery 50 (has a positive value when the battery 50 is discharged) such that the state of charge SOC of the battery 50 approximates a target SOC*. As expressed by the following equation (1), the HVECU 70 calculates target engine power Pe* by subtracting the charge/discharge requested power Pb* of the battery 50 from the travel requested power Pedrv. For example, the charge/discharge requested power Pb* is set by a charge/discharge requested power setting map that is exemplified in FIG. 4. A dead zone from a value S1 to a value S2 that is centered on the target SOC* is provided in the charge/discharge requested power setting map. Discharging power (power with a positive value) is set for the charge/discharge requested power Pb* when the state of charge SOC is larger than the value S2 on an upper limit of the dead zone. Charging power (power with a negative value) is set for the charge/discharge requested power Pb* when the state of charge SOC is smaller than the value S1 on a lower limit of the dead zone.

$$Pe^* = Pedrv - Pb^* \quad (1)$$

Figure 5:
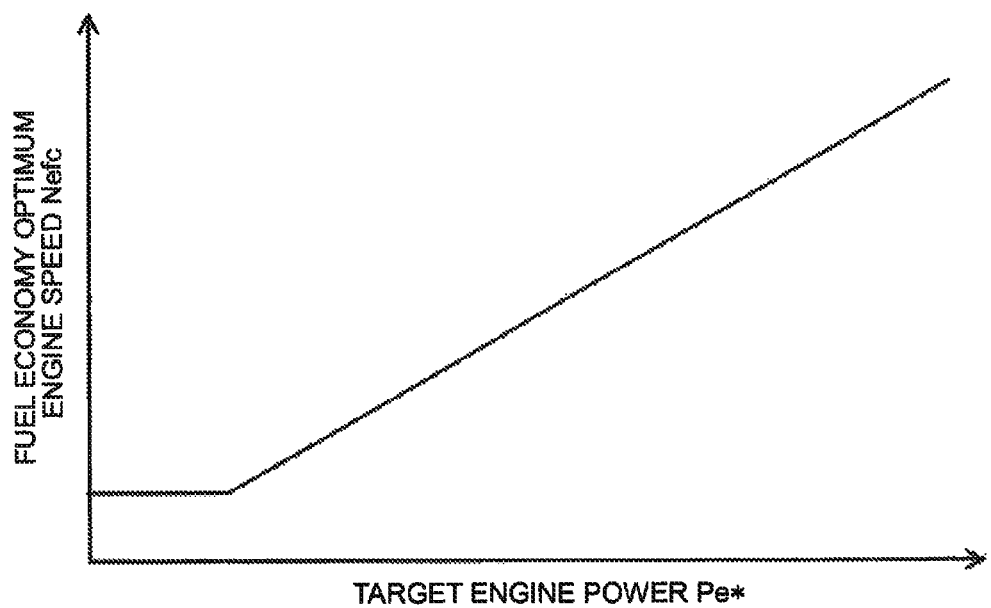
FIG. 5 is an explanatory chart that shows one example of a fuel economy optimum engine speed setting map.

Next, the HVECU 70 calculates a fuel economy optimum engine speed Nefc by using the target engine power Pe* and a fuel economy optimum engine speed setting map and sets the fuel economy optimum engine speed Nefc as a target engine speed Ne*. One example of the fuel economy optimum engine speed setting map is shown in FIG. 5. The fuel economy optimum engine speed setting map is defined by an experiment or the like as a map of a speed at which the engine 22 can efficiently be operated with respect to the target engine power Pe*. The fuel economy optimum engine speed Nefc is basically increased as the target engine power Pe* is increased. Thus, the target engine speed Ne* is also increased as the target engine power Pe* is increased. Next, as expressed by the following equation (2), the HVECU 70 calculates a torque command Tm1* of the motor MG1 by using the speed Ne of the engine 22, the target engine speed Ne*, the target engine power Pe*, and a gear ratio ρ of the planetary gear 30 (number of teeth of the sun gear/number of teeth of the ring gear). The equation (2) is a relational equation of speed feedback control that is used to rotate the engine 22 at the target engine speed Ne*. In the equation (2), a first term of a right side is a feedforward term, and a second term and a third term of the right side are a proportional term and an integral term of a feedback term, respectively. The first term of the right side represents torque used to receive torque by the motor MG1, the torque being output from the engine 22 and applied to a rotational shaft of the motor MG1 via the planetary gear 30. The second term "kp" of the right side is a gain of the proportional term, and the third term "ki" of the right side is a gain of the integral term. Here, when a substantially steady state of the engine 22 (the target engine speed Ne* and the target engine power Pe* are substantially constant) is considered, it can be understood that, as the target engine power Pe* is increased, the first term of the right side of the equation (2) is reduced (increased as an absolute value), the torque command Tm1* of the motor MG1 is reduced (increased on a negative side), and electric power of the motor MG1 (shows a positive value when the electric power is consumed) that is obtained by multiplying the torque command Tm1* of the motor MG1 by the rotational speed Nm1 is reduced (increased as generated electric power).

$$Tm1^* = -(Pe^*/Ne^*) \bullet [\rho/(1+\rho)] + kp \bullet (Ne^* - Ne) + ki \bullet \int (Ne^* - Ne)dt \quad (2)$$

Next, as expressed by the following equation (3), the HVECU 70 sets a torque command Tm2* of the motor MG2 by subtracting torque (−Tm1*/ρ) from the execution drive power Td*, the torque being output from the motor MG1 and applied to the driveshaft 36 via the planetary gear 30 at a time when the motor MG1 is driven by the torque command Tm1*. Note that the torque command Tm2* of the motor MG2 is limited by a torque limit Tm2max that is obtained by an equation (4) from an output limit Wout of the battery 50. As expressed by the equation (4), the torque limit Tm2max is obtained by subtracting the electric power of the motor MG1 from the output limit Wout of the battery 50 and dividing this by the rotational speed Nm2 of the motor MG2, the electric power being obtained by multiplying the torque command Tm1* of the motor MG1 by the rotational speed Nm1.

$$Tm2^* = Td^* + Tm1^*/\rho \quad (3)$$

$$Tm2\max = (Wout - Tm1^* \bullet Nm1)/Nm2 \quad (4)$$

When the target engine power Pe*, the target engine speed Ne*, and the torque commands Tm1*, Tm2* of the motors MG1, MG2 are set as described above, the target engine power Pe* and the target engine speed Ne* are transmitted to the engine ECU 24, and the torque commands Tm1*, Tm2* of the motors MG1, MG2 are transmitted to the motor ECU 40.

When receiving the target engine power Pe* and the target engine speed Ne*, the engine ECU 24 executes intake air amount control, fuel injection control, ignition control, and the like of the engine 22 such that the engine 22 is operated on the basis of the received target engine power Pe* and target engine speed Ne*. When receiving the torque commands Tm1*, Tm2* of the motors MG1, MG2, the motor ECU 40 executes switching control of the plural switching elements of the inverters 41, 42 such that the motors MG1, MG2 are driven by the torque commands Tm1*, Tm2*.

In the HV travel mode, when the target engine power Pe* becomes lower than a threshold Pref, the HVECU 70 determines that a stop condition of the engine 22 is established, stops the operation of the engine 22, and shifts to the EV travel mode.

In the EV travel mode, the HVECU 70 sets the execution drive power Td* as in the HV travel mode, sets a value 0 for the torque command Tm1* of the motor MG1, and sets the torque command Tm2* of the motor MG2 as in the HV travel mode. Then, the HVECU 70 transmits the torque commands Tm1*, Tm2* of the motors MG1, MG2 to the motor ECU 40. As described above, the motor ECU 40 executes the switching control of the plural switching elements of the inverters 41, 42.

In this EV travel mode, when the target engine power Pe* that is calculated in the same manner as in the HV travel mode becomes equal to or higher than the threshold Pref, the HVECU 70 determines that a start condition of the engine 22 is established, starts the engine 22, and shifts to an HV travel.

Next, a description will be made on the drive control at the time of the drive feeling prioritized mode and the D position by using the drivability prioritized drive control routine in FIG. 2. When the drivability prioritized drive control routine is executed, the HVECU 70 first receives the accelerator pedal operation amount Acc from the accelerator pedal position sensor 84, the vehicle speed V from the vehicle speed sensor 88, and the speed Ne of the engine 22 (step S100) and sets the accelerator requested drive power Tda by using the received accelerator pedal operation amount Acc and vehicle speed V and the accelerator requested drive power setting map in FIG. 3 (step S110). Here, the speed Ne of the engine 22 that is calculated on the basis of the crank angle θcr from the crank position sensor 23 can be received from the engine ECU 24 by communication.

Figure 6:
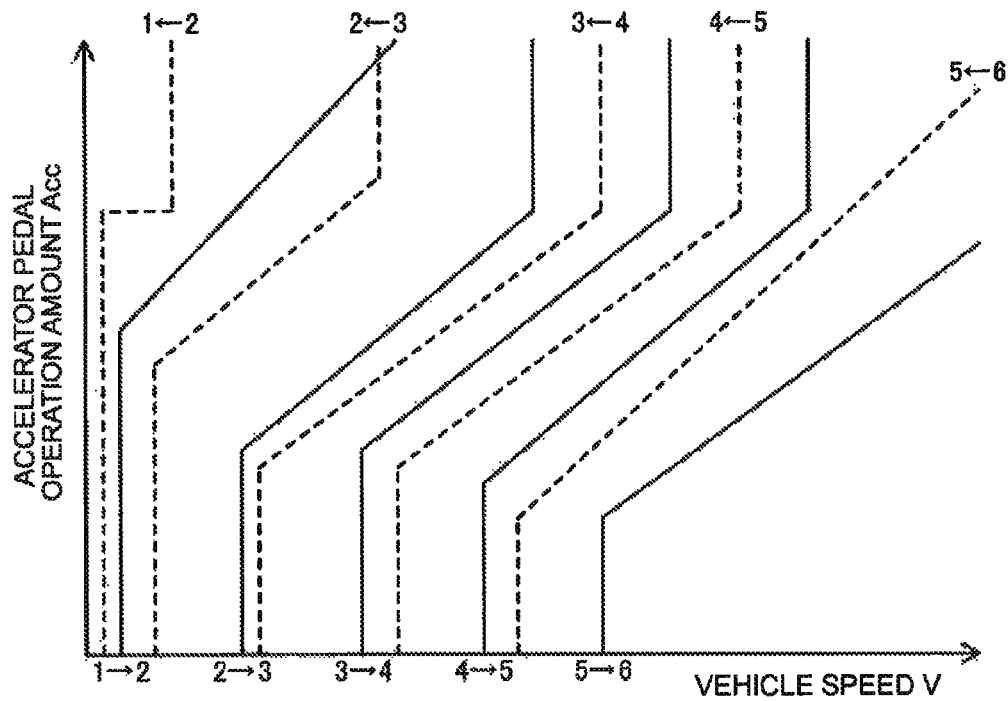
FIG. 6 is an explanatory chart that shows one example of a gear change chart.
Figure 7:
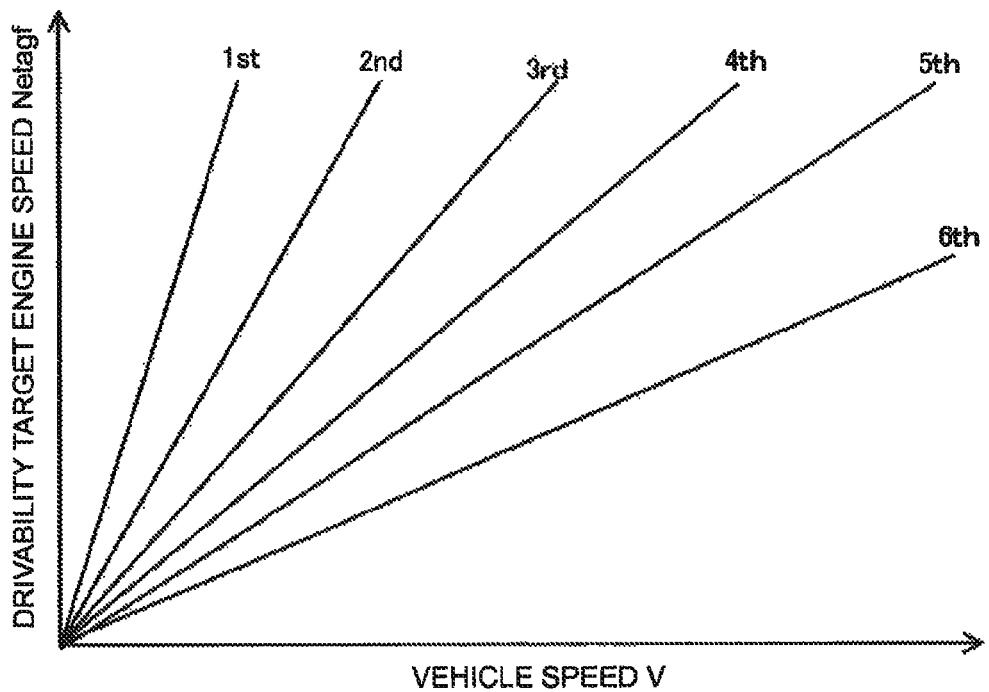
FIG. 7 is an explanatory chart that shows one example of a drivability target engine speed setting map.

Next, the HVECU 70 sets a gear stage M by using the accelerator pedal operation amount Acc, the vehicle speed V, and a gear change chart (step S120), and sets a drivability target engine speed Netagf by using the vehicle speed V, the gear stage M, and a drivability target engine speed setting map (step S130). One example of the gear change chart is shown in FIG. 6. In the chart, solid lines are upshift lines, broken lines are downshift lines. In the first example, the vehicle is controlled as having the virtual six-speed automatic transmission. Thus, the gear change chart corresponds to a six-speed gear change. FIG. 7 shows one example of the drivability target engine speed setting map. In the drivability target engine speed setting map of the first example, the drivability target engine speed Netagf is set to have a linear relationship with the vehicle speed V at each gear stage and such that a gradient thereof with respect to the vehicle speed V is reduced as the gear stage is shifted to a higher gear stage. A reason that the drivability target engine speed Netagf is set, just as described, is to provide the driver with drive feeling of a vehicle on which an automatic transmission is mounted by increasing the speed Ne of the engine 22 as the vehicle speed V is increased at each of the gear stages, by reducing the speed Ne of the engine 22 upon an upshift, and by increasing the speed Ne of the engine 22 upon a downshift.

Next, upper limit engine power Pelim is set by adding the charge/discharge requested power Pb* to tentative upper limit engine power Pelim that is obtained by using the drivability target engine speed Netagf and an upper limit engine power setting map (step S140). The reason why the charge/discharge requested power Pb* is added is to prevent a change in the power output from the engine 22 at a time when the battery 50 is charged/discharged, and this will be described below. Note that, when the state of charge SOC falls within the dead zone (a range from the value S1 to the value S2 in FIG. 4) that is centered on the target SOC*, a value 0 is set for the charge/discharge requested power Pb*. Accordingly, the tentative upper limit engine power Pelim itself, which is obtained from the upper limit engine power setting map, is set as the upper limit engine power Pelim. After the upper limit engine power Pelim is set as described above, upper limit drive power Tdlim is set by dividing the upper limit engine power Pelim by the rotational speed Nd of the driveshaft 36 (step S150). As described above, as the rotational speed Nd of the driveshaft 36, a rotational speed that is obtained by multiplying the rotational speed Nm2 of the motor MG2 by the conversion coefficient km, a rotational speed that is obtained by multiplying the vehicle speed V by the conversion coefficient kv, or the like can be used.

Next, the accelerator requested drive power Tda and the upper limit drive power Tdlim are compared (step S160). When the accelerator requested drive power Tda is equal to or lower than the upper limit drive power Tdlim, similar to the normal drive mode, the HVECU 70 sets the accelerator requested drive power Tda as the execution drive power Td* (step S170), and sets power that is obtained by subtracting the charge/discharge requested power Pb* from power that is obtained by multiplying the accelerator requested drive power Tda by the rotational speed Nd of the driveshaft 36 as the target engine power Pe* (step S180). Thus, it can be said that the target engine power Pe* corresponds to power by which the accelerator requested drive power Tda is output to the driveshaft 36.

On the other hand, if it is determined in step S160 that the accelerator requested drive power Tda is higher than the upper limit drive power Tdlim, the HVECU 70 sets the upper limit drive power Tdlim as the execution drive power Td* (step S190), and power that is obtained by subtracting the charge/discharge requested power Pb* from the upper limit engine power Pelim is set as the target engine power Pe* (step S200). The upper limit engine power Pelim is set by adding the charge/discharge requested power Pb* to the tentative upper limit engine power Pelim that is obtained from the upper limit engine power setting map in step S140. To set the power that is obtained by subtracting the charge/discharge requested power Pb* from the upper limit engine power Pelim as the target engine power Pe* is to set the tentative upper limit engine power Pelim itself that is obtained from the upper limit engine power setting map as the target engine power Pe*. When the charge/discharge requested power Pb* is taken into consideration, just as described, an operation point of the engine 22 can be the same regardless of charging/discharging of the battery 50. In addition, the upper limit drive power Tdlim is computed by dividing the upper limit engine power Pelim by the rotational speed Nd of the driveshaft 36 in step S150. It can be said that the upper limit engine power Pelim corresponds to power by which the upper limit drive power Tdlim is output to the driveshaft 36.

Next, the HVECU 70 determines whether the gear stage M is equal to or higher than a threshold Mref (step S210). Here, as the threshold Mref, a sixth gear stage, a fifth gear stage, or the like as a highest gear stage can be used, for example. When the gear stage M is equal to or higher than the threshold Mref, the HVECU 70 uses the target engine power Pe* and the fuel economy optimum engine speed setting map in FIG. 5 to set the fuel economy optimum engine speed Nefc (step S220), and a lower one of the set fuel economy optimum engine speed Nefc and the drivability target engine speed Netagf as the target engine speed Ne* (step S230). A reason why the lower one of the fuel economy optimum engine speed Nefc and the drivability target engine speed Netagf is set as the target engine speed Ne* at the time when the gear stage M is equal to or higher than the threshold Mref is to avoid the engine from being operated at the high speed in such a degree that the driver receives the sense of discomfort while taking the fuel economy into consideration. In the case where the vehicle cruises at the relatively high speed with the gear stage M being the high gear stage of the threshold Mref or higher, for example, the sixth gear stage as the highest gear stage, the significantly high power is not required for the travel. Thus, the fuel economy optimum engine speed Nefc possibly becomes lower than a drivability engine speed Nedrvf. In this case, the fuel economy optimum engine speed Nefc is set as the target engine speed Ne*. In this way, the fuel economy can be favorable. On the other hand, if the fuel economy optimum engine speed Nefc is higher than the drivability engine speed Nedrvf, the drivability engine speed Nedrvf is set as the target engine speed Ne*. Thus, the engine 22 can be operated at the speed that corresponds to the gear stage M. In this way, the engine 22 can be avoided from being operated at the high speed in such a degree that the driver receives the sense of discomfort while the fuel economy is taken into consideration.

If the HVECU 70 determines that the gear stage M is lower than the threshold Mref in step S210, the HVECU 70 sets the drivability target engine speed Netagf as the target engine speed Ne* (step S240). When the drivability engine speed Nedrvf is set as the target engine speed Ne*, the engine 22 can be operated at the speed that corresponds to the gear stage M, and the driver can receive the favorable drive feeling.

Then, the HVECU 70 sets the torque command Tm1* of the motor MG1 by the above-described equation (2) (step S250) and sets the torque command Tm2* of the motor MG2 by the equation (3) (step S260). The target engine power Pe* and the target engine speed Ne* are transmitted to the engine ECU 24, and the torque commands Tm1*, Tm2* are transmitted to the motor ECU 40 (step S270). Then, this routine is terminated.

In the routine, when the accelerator requested drive power Tda is equal to or lower than the upper limit drive power Tdlim and the gear stage M is lower than the threshold Mref, the HVECU 70 sets the power, by which the accelerator requested drive power Tda is output to the driveshaft 36, as the target engine power Pe* and sets the drivability target engine speed Netagf as the target engine speed Ne*. When the accelerator requested drive power Tda is equal to or lower than the upper limit drive power Tdlim and the gear stage M is equal to or higher than the threshold Mref, the HVECU 70 sets the power, by which the accelerator requested drive power Tda is output to the driveshaft 36, as the target engine power Pe*, and sets the lower one of the fuel economy optimum engine speed Nefc, at which the target engine power Pe* realizing the optimum fuel economy is output from the engine 22, and the drivability target engine speed Netagf as the target engine speed Ne*. When the accelerator requested drive power Tda is higher than the upper limit drive power Tdlim and the gear stage M is lower than the threshold Mref, the HVECU 70 set the power, by which the upper limit drive power Tdlim is output to the driveshaft 36, as the target engine power Pe*, and sets the drivability target engine speed Netagf as the target engine speed Ne*. When the accelerator requested drive power Tda is higher than the upper limit drive power Tdlim and the gear stage M is equal to or higher than the threshold Mref, the HVECU 70 sets the power, by which the upper limit drive power Tdlim is output to the driveshaft 36, as the target engine power Pe*, and sets the lower one of the fuel economy optimum engine speed Nefc, at which the target engine power Pe* realizing the optimum fuel economy is output from the engine 22, and the drivability target engine speed Netagf as the target engine speed Ne*. Thus, in any of these cases, the speed Ne of the engine 22 can be suppressed from becoming higher than the drivability target engine speed Netagf that is based on the vehicle speed V and the gear stage M.

In the hybrid vehicle 20 of the first example that has been described so far, at the time of the D position in the drive feeling prioritized mode, the gear stage M is set on the basis of the accelerator pedal operation amount Acc and the vehicle speed V, and the drivability target engine speed Netagf is set on the basis of the vehicle speed V and the gear stage M. In addition, in the hybrid vehicle 20 of the first example, the upper limit engine power Pelim is set on the basis of the drivability target engine speed Netagf, and the upper limit drive power Tdlim is set by dividing the upper limit engine power Pelim by the rotational speed Nd of the driveshaft 36. Then, in the hybrid vehicle 20 of the first example, the engine 22 and the motors MG1, MG2 are controlled such that the power by which the lower drive power of the accelerator requested drive power Tda and the upper limit drive power Tdlim is output to the driveshaft 36 is set as the target engine power Pe* and that the vehicle travels while the target engine power Pe* is output from the engine 22. In summary, the hybrid vehicle 20 of the first example is controlled to travel in such a state where the target engine power Pe* is set such that the lower one of the accelerator requested drive power Tda, which is set without the gear stage M being taken into consideration, and the upper limit drive power Tdlim, which is set with the gear stage M being taken into consideration, is output to the driveshaft 36, and the target engine power Pe* is output from the engine 22. Accordingly, even when the driver depresses the accelerator pedal 83, the speed Ne of the engine 22 can correspond to the vehicle speed V, and thus the driver can receive the further favorable drive feeling when compared to a case where the speed Ne of the engine 22 is rapidly increased prior to an increase in the vehicle speed V. In addition, when the gear stage is changed (shifted), the target engine power Pe* that corresponds to the gear stage M is also changed. Thus, the driver can receive gear change feeling. As the result of these, the driver can receive the further favorable drive feeling.

Furthermore, in the hybrid vehicle 20 of the first example, when the gear stage M is lower than the threshold Mref, the drivability target engine speed Netagf is set as the target engine speed Ne*. In this way, when the gear stage M is lower than the threshold Mref, the speed Ne of the engine 22 can be suppressed from becoming higher than the rotational speed (the drivability target engine speed Netagf) that corresponds to the vehicle speed V and the gear stage M. When the gear stage M is equal to or higher than the threshold Mref, the lower one of the fuel economy optimum engine speed Nefc, at which the target engine power Pe* realizing the optimum fuel economy is output from the engine 22, and the drivability target engine speed Netagf is set as the target engine speed Ne*. In this way, even when the gear stage M is equal to or higher than the threshold Mref, the speed Ne of the engine 22 can be suppressed from becoming higher than the rotational speed (the drivability target engine speed Netagf) that corresponds to the vehicle speed V and the gear stage M.

In the hybrid vehicle 20 of the first example, when the accelerator requested drive power Tda is equal to or lower than the upper limit drive power Tdlim, the power, by which the accelerator requested drive power Tda is output to the driveshaft 36, is set as the target engine power Pe*, and the fuel economy optimum engine speed Nefc, which is basically obtained on the basis of the accelerator requested drive power Tda, is set as the target engine speed Ne*. In this way, the vehicle can travel with the favorable fuel economy.

In the hybrid vehicle 20 of the first example, in the case where the accelerator requested drive power Tda is higher than the upper limit drive power Tdlim at the time when the battery 50 is charged/discharged, the upper limit engine power Pelim is set by adding the charge/discharge requested power Pb* to the tentative upper limit engine power Pelim, which is obtained from the upper limit engine power setting map, (step S140) and the power obtained by subtracting the charge/discharge requested power Pb* from the upper limit engine power Pelim is set as the target engine power Pe* (step S200). In this way, even in the case where the accelerator requested drive power Tda is higher than the upper limit drive power Tdlim when the battery 50 is charged/discharged, the target engine power Pe* that is the same as the time when the battery 50 is not charged/discharged is set, and the engine 22 is operated at the operation point that is the same as the time when the battery 50 is not charged/discharged. Accordingly, the speed Ne of the engine 22 is avoided from being increased or reduced from the rotational speed (the drivability target engine speed Netagf) that corresponds to the vehicle speed V and the gear stage M due to charging/discharging of the battery 50.

In the hybrid vehicle 20 of the first example, the power, by which the lower drive power of the accelerator requested drive power Tda and the upper limit drive power Tdlim is output to the driveshaft 36, is set as the target engine power Pe*. However, the target engine power Pe* may be set such that lower one of the power that is obtained by multiplying the accelerator requested drive power Tda by the rotational speed Nd of the driveshaft 36 (Tda×Nd) and power that is obtained by multiplying the upper limit drive power Tdlim by the rotational speed Nd of the driveshaft 36 (Tdlim×Nd) is output to the driveshaft 36. That is, in step S160, a process of comparing the power that is obtained by multiplying the accelerator requested drive power Tda by the rotational speed Nd of the driveshaft 36 (Tda×Nd) with the power that is obtained by multiplying the upper limit drive power Tdlim by the rotational speed Nd of the driveshaft 36 (Tdlim×Nd) may be executed.

In the hybrid vehicle 20 of the first example, when the gear stage M is lower than the threshold Mref, the drivability target engine speed Netagf is set as the target engine speed Ne*. When the gear stage M is equal to or higher than the threshold Mref, the lower one of the fuel economy optimum engine speed Nefc, at which the target engine power Pe* realizing the optimum fuel economy is output from the engine 22, and the drivability target engine speed Netagf is set as the target engine speed Ne*. However, the drivability target engine speed Netagf may be set as the target engine speed Ne* at all of the gear stages M, or the lower one of the fuel economy optimum engine speed Nefc, at which the target engine power Pe* realizing the optimum fuel economy is output from the engine 22, and the drivability target engine speed Netagf may be set as the target engine speed Ne* at all of the gear stages M.

The hybrid vehicle 20 of the first example includes the mode switching switch 90, and the drivability prioritized drive control routine in FIG. 2 is executed when the drive feeling prioritized mode is selected by the mode switching switch 90. However, the mode switching switch 90 may not be provided, and the drivability prioritized drive control routine in FIG. 2 may be executed as normal drive control.

Figure 9:
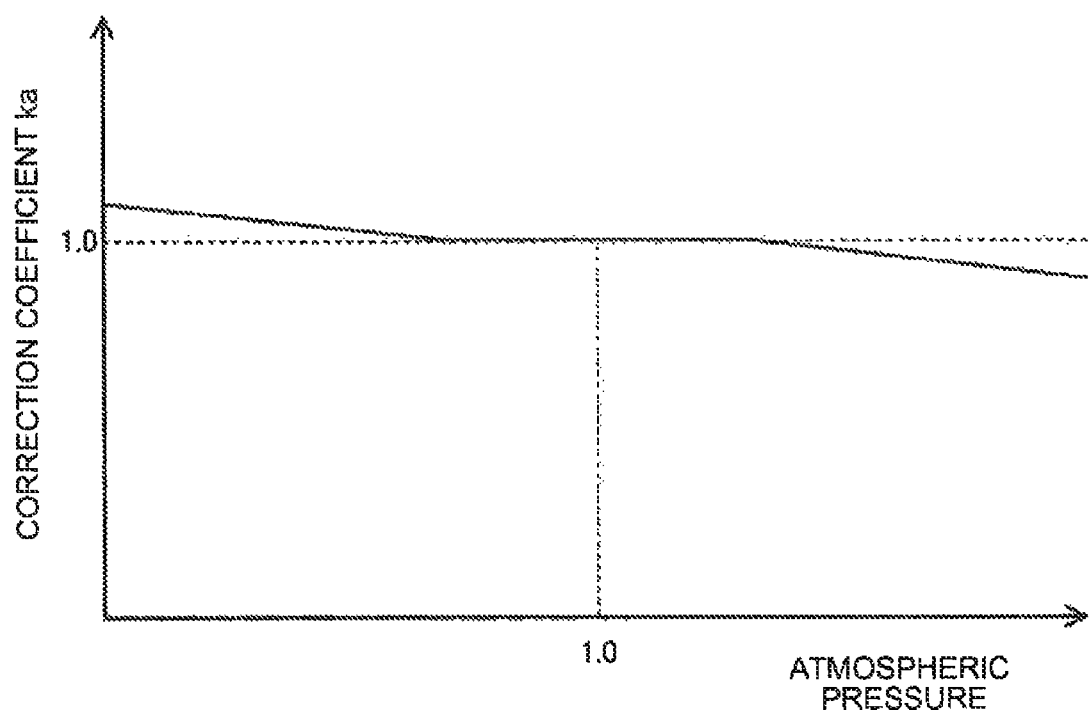
FIG. 9 is an explanatory chart that shows one example of a relationship between an atmospheric pressure correction coefficient ka and atmospheric pressure Pa.

In the hybrid vehicle 20 of the first example, charging/discharging of the battery 50 is taken into consideration when the upper limit engine power Pelim is set. However, the atmospheric pressure Pa may further be taken into consideration. In this case, when the accelerator requested drive power Tda is higher than the upper limit drive power Tdlim, the upper limit engine power Pelim may be set by dividing the upper limit engine power Pelim obtained in step S140 by an atmospheric pressure correction coefficient ka, and the target engine power Pe* may be set by multiplying the target engine power Pe* obtained in step S200 by the atmospheric pressure correction coefficient ka. One example of a relationship between the atmospheric pressure correction coefficient ka and the atmospheric pressure Pa is shown in FIG. 9. The power that is output from the engine 22 is reduced as the atmospheric pressure Pa is lowered. Thus, the target engine power Pe* is usually set by being multiplied by the atmospheric pressure correction coefficient ka that is increased as the atmospheric pressure Pa is lowered. Thus, the speed Ne of the engine 22 is increased. However, as in this example, when the upper limit engine power Pelim is set by dividing the upper limit engine power Pelim by the atmospheric pressure correction coefficient ka and the target engine power Pe* is set by multiplying the target engine power Pe* by the atmospheric pressure correction coefficient ka, the engine 22 can be operated by setting the same target engine power Pe* regardless of the atmospheric pressure Pa. In this way, the speed Ne of the engine 22 can be avoided from being increased or reduced from the rotational speed (the drivability target engine speed Netagf) that corresponds to the vehicle speed V and the gear stage M depending on a magnitude of the atmospheric pressure Pa. In addition, when the accelerator requested drive power Tda is equal to or lower than the upper limit drive power Tdlim, the target engine power Pe* may be set by multiplying the target engine power Pe* obtained in step S180 by the atmospheric pressure correction coefficient ka. Also in this case, the fuel economy optimum engine speed Nefc, at which the target engine power Pe* realizing the optimum fuel economy is output from the engine 22, is limited by the rotational speed (the drivability target engine speed Netagf) that corresponds to the vehicle speed V and the gear stage M, and thereby the target engine speed Ne* is set. In this way, the speed Ne of the engine 22 can be avoided from becoming higher than the rotational speed (the drivability target engine speed Netagf) that corresponds to the vehicle speed V and the gear stage M due to the magnitude of the atmospheric pressure Pa.

Figure 10:
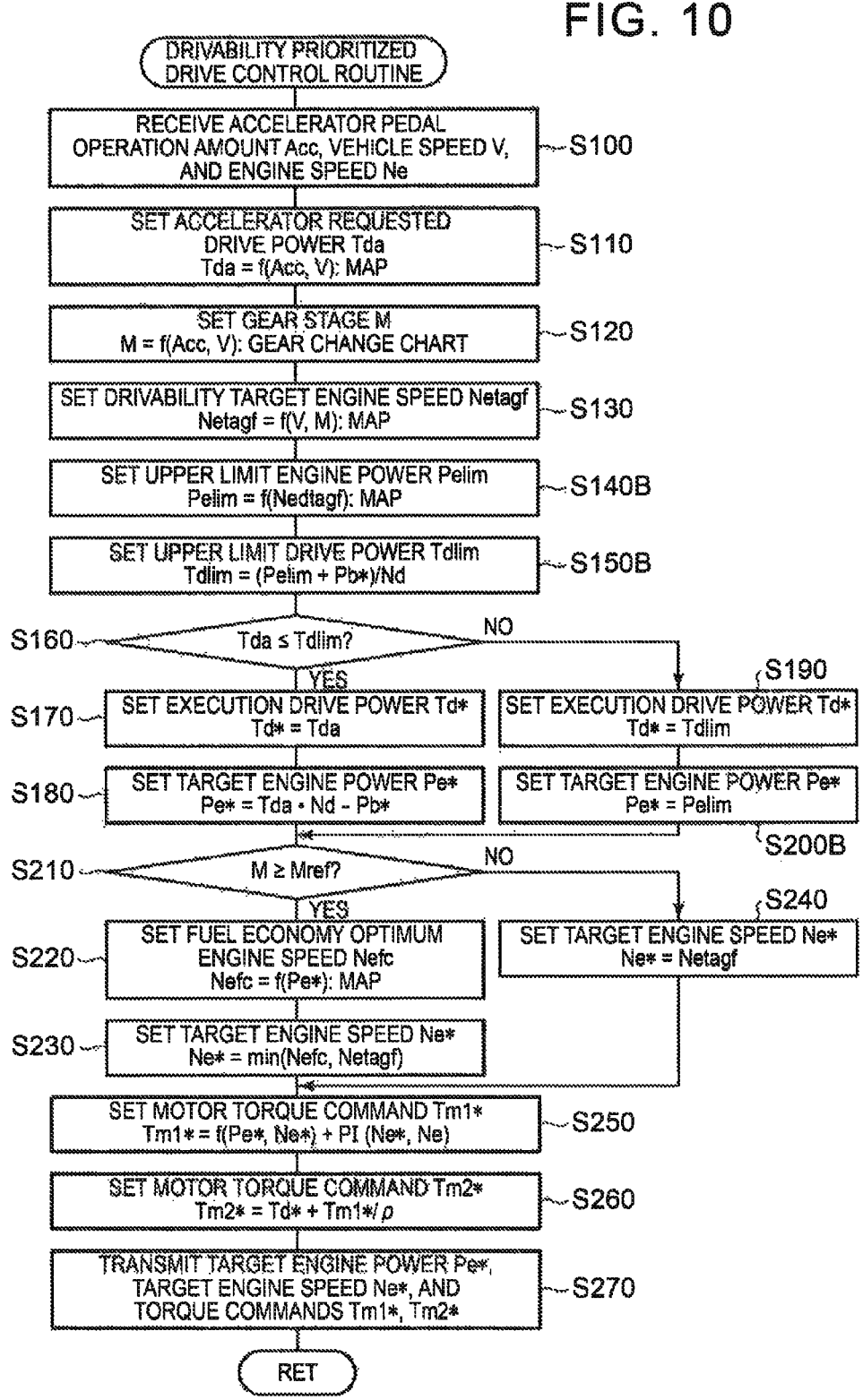
FIG. 10 is a flowchart of one example of a drivability prioritized drive control routine in a modified example.

In the hybrid vehicle 20 of the first example, in the case where the accelerator requested drive power Tda is higher than the upper limit drive power Tdlim when the battery 50 is charged/discharged, the upper limit engine power Pelim is set by adding the charge/discharge requested power Pb* to the tentative upper limit engine power Pelim that is obtained from the upper limit engine power setting map (step S140), and the power that is obtained by subtracting the charge/discharge requested power Pb* from the upper limit engine power Pelim is set as the target engine power Pe* (step S200). However, as shown in the drivability prioritized drive control routine of FIG. 10, the tentative upper limit engine power Pelim itself that is obtained from the upper limit engine power setting map may be set as the upper limit engine power Pelim (step S140B), the upper limit drive power Tdlim may be set by dividing power that is obtained by adding the charge/discharge requested power Pb* to the upper limit engine power Pelim by the rotational speed Nd of the driveshaft 36 (step S150B), and the upper limit engine power Pelim itself may be set as the target engine power Pe* (step S200B). Although there is a difference between a case where the charge/discharge requested power Pb* is taken into consideration for calculation of the upper limit engine power Pelim and a case where the charge/discharge requested power Pb* is taken into consideration for calculation of the upper limit drive power Tdlim, the result is the same.

Figure 11:
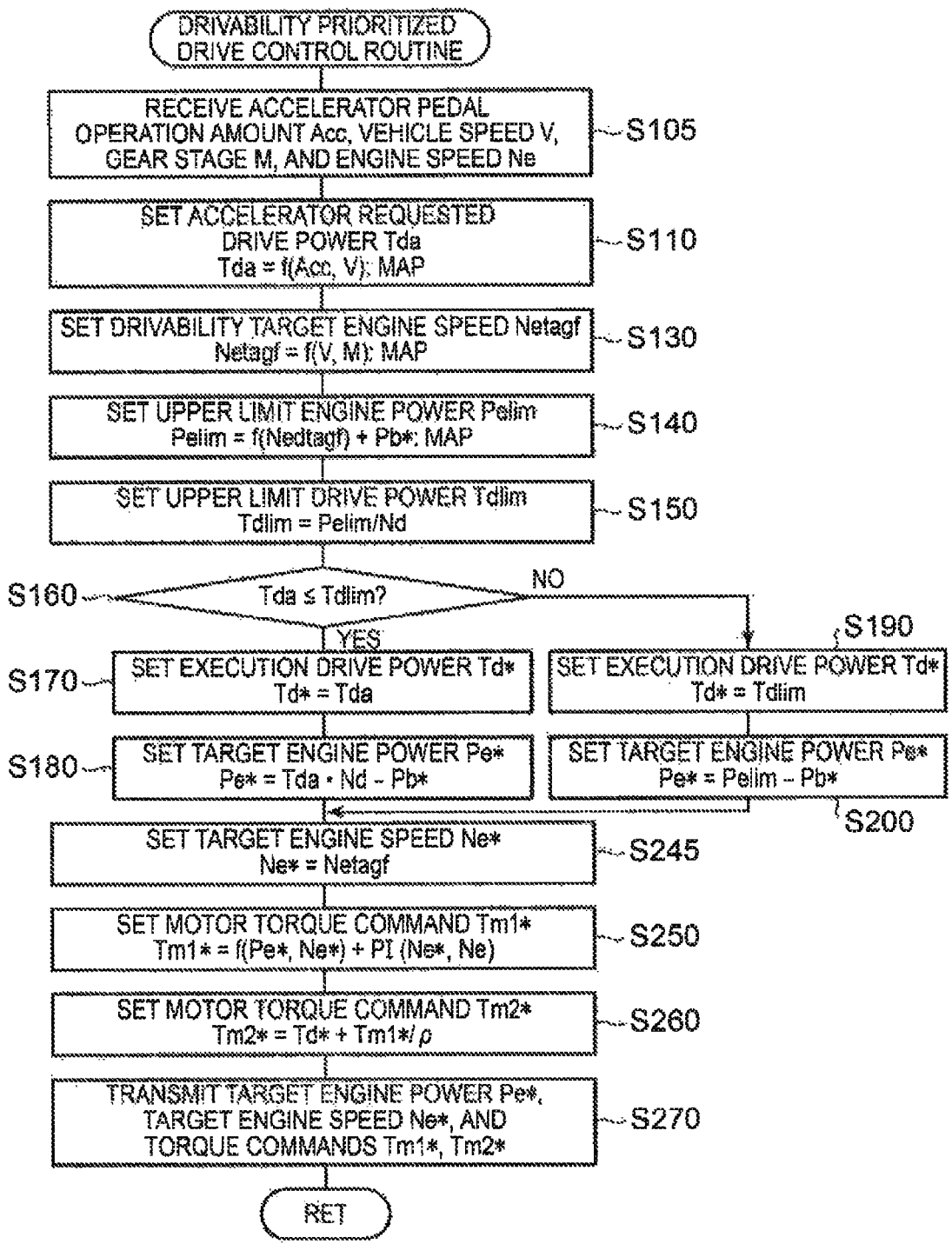
FIG. 11 is a flowchart of one example of the drivability prioritized drive control routine that is executed by the HVECU 70 at a time of an M position.

Next, a description will be made on an operation at a time when the shift position SP of the hybrid vehicle 20 of the first example is the manual position (M position). In this case, a drivability prioritized drive control routine in FIG. 1 may be executed. The drivability prioritized drive control routine in FIG. 11 is the same as the drivability prioritized drive control routine in FIG. 2 except for a point that a process of inputting the gear stage M as the shift position SP (step S105) is added, a point that the process of setting the gear stage M by using the gear change chart in step S120 in FIG. 6 is removed, and a point that the process of setting the drivability target engine speed Netagf as the target engine speed Ne* regardless of the gear stage M (step S245) is adopted. A brief description will hereinafter be made on the drive control at the time when the shift position SP is the manual position (M position) by using the drivability prioritized drive control routine in FIG. 11.

Figure 3:
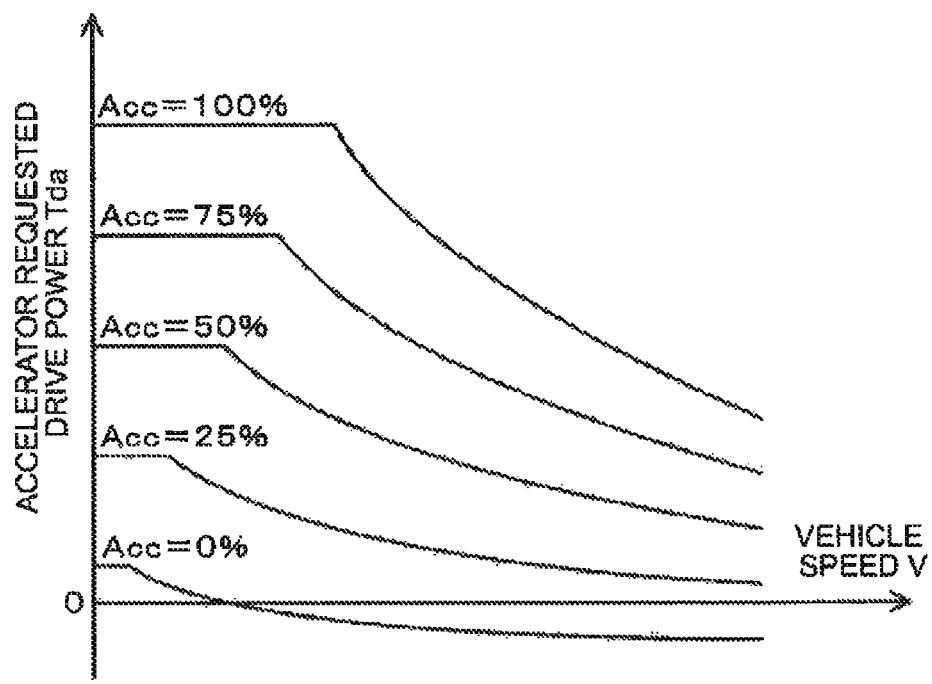
FIG. 3 is an explanatory chart that shows one example of an accelerator requested drive power setting map.
Figure 4:
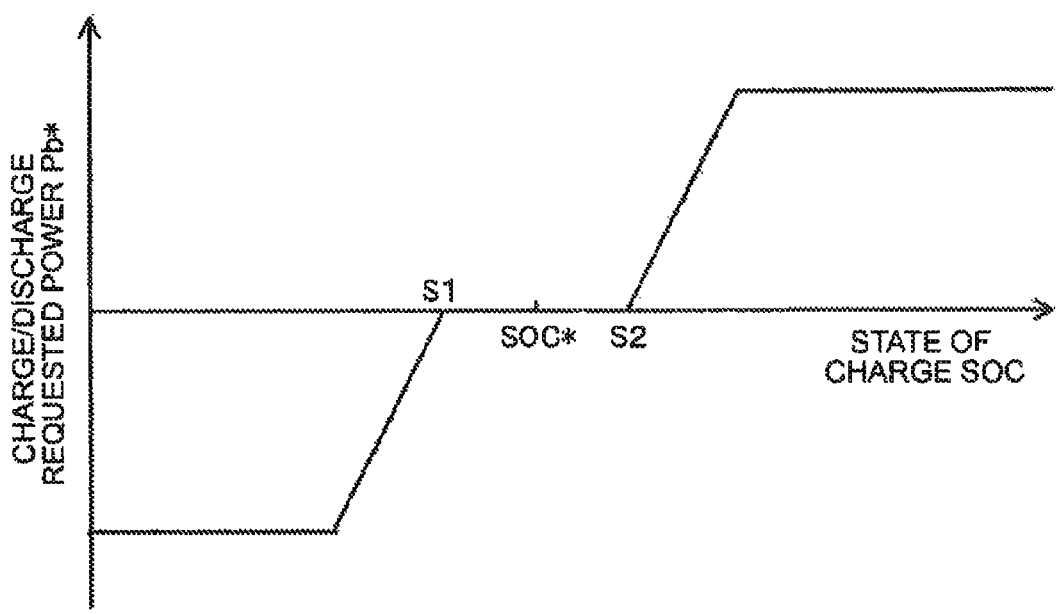
FIG. 4 is an explanatory chart that shows one example of a charge/discharge requested power setting map.

When the drivability prioritized drive control routine in FIG. 11 is executed, the HVECU 70 first receives the accelerator pedal operation amount Acc, the vehicle speed V, the gear stage M, and the speed Ne of the engine 22 (step S105) and sets the accelerator requested drive power Tda by using the accelerator pedal operation amount Acc, the vehicle speed V, and the accelerator requested drive power setting map in FIG. 3 (step S110). Next, the HVECU 70 sets the drivability target engine speed Netagf by using the vehicle speed V, the gear stage M, and the drivability target engine speed setting map in FIG. 7 (step S130) and sets the upper limit engine power Pelim by adding the charge/discharge requested power Pb* to the tentative upper limit engine power Pelim that is obtained by using the drivability target engine speed Netagf and the upper limit engine power setting map in FIG. 8 (step S140). Then, the HVECU 70 sets the upper limit drive power Tdlim by dividing the upper limit engine power Pelim by the rotational speed Nd of the driveshaft 36 (step S150) and compares the accelerator requested drive power Tda with the upper limit drive power Tdlim (step S160).

If the accelerator requested drive power Tda is equal to or lower than the upper limit drive power Tdlim, the HVECU 70 sets the accelerator requested drive power Tda as the execution drive power Td* (step S170), and sets the power that is obtained by subtracting the charge/discharge requested power Pb* from the power that is obtained by multiplying the accelerator requested drive power Tda by the rotational speed Nd of the driveshaft 36 as the target engine power Pe* (step S180). If the accelerator requested drive power Tda is higher than the upper limit drive power Tdlim, the HVECU 70 sets the upper limit drive power Tdlim as the execution drive power Td* (step S190), and sets the power that is obtained by subtracting the charge/discharge requested power Pb* from the upper limit engine power Pelim as the target engine power Pe* (step S200).

Next, the HVECU 70 sets the drivability target engine speed Netagf as the target engine speed Ne* (step S245), sets the torque command Tm1* of the motor MG1 by the above-described equation (2) (step S250), and sets the torque command Tm2* of the motor MG2 by the equation (3) (step S260). Then, the HVECU 70 transmits the target engine power Pe* and the target engine speed Ne* to the engine ECU 24 and transmits the torque commands Tm1*, Tm2* to the motor ECU 40 (step S270). Thereafter, this routine is terminated.

In the hybrid vehicle 20 of the first example that has been described so far, when the shift position SP is the manual position (M position), the drivability target engine speed Netagf is set as the target engine speed Ne* at all of the gear stages M. In this way, the speed Ne of the engine 22 can always be set as the drivability target engine speed Netagf, which is based on the vehicle speed V and the gear stage M. As a result of this, the driver can receive the further favorable drive feeling.

Figure 12:
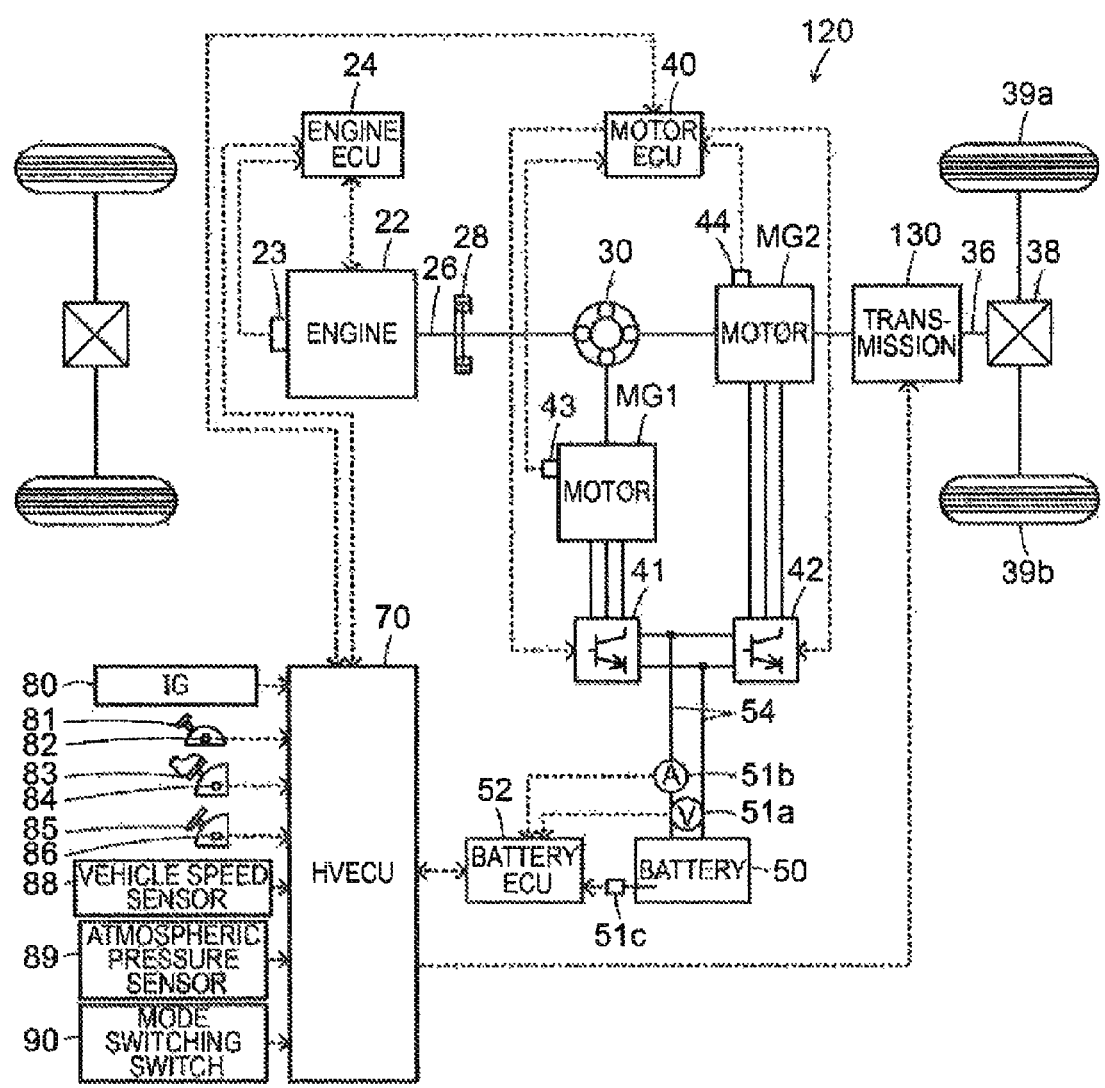
FIG. 12 is a configuration diagram that schematically shows a configuration of a hybrid vehicle 120 of a second example.

Next, a description will be made on a hybrid vehicle 120 of a second example of the disclosure. FIG. 12 shows a schematic configuration of the hybrid vehicle 120 of the second example. As shown in FIG. 12, the hybrid vehicle 120 of the second example has the same configuration as that of the hybrid vehicle 20 of the first example shown in FIG. 1 except for a point that a transmission 130 is provided. In order to omit an overlapping description, the configuration of the hybrid vehicle 120 of the second example that is the same as that of the hybrid vehicle 20 of the first example is denoted by the same reference numerals, and a detailed description thereon will not be made.

Figure 13:
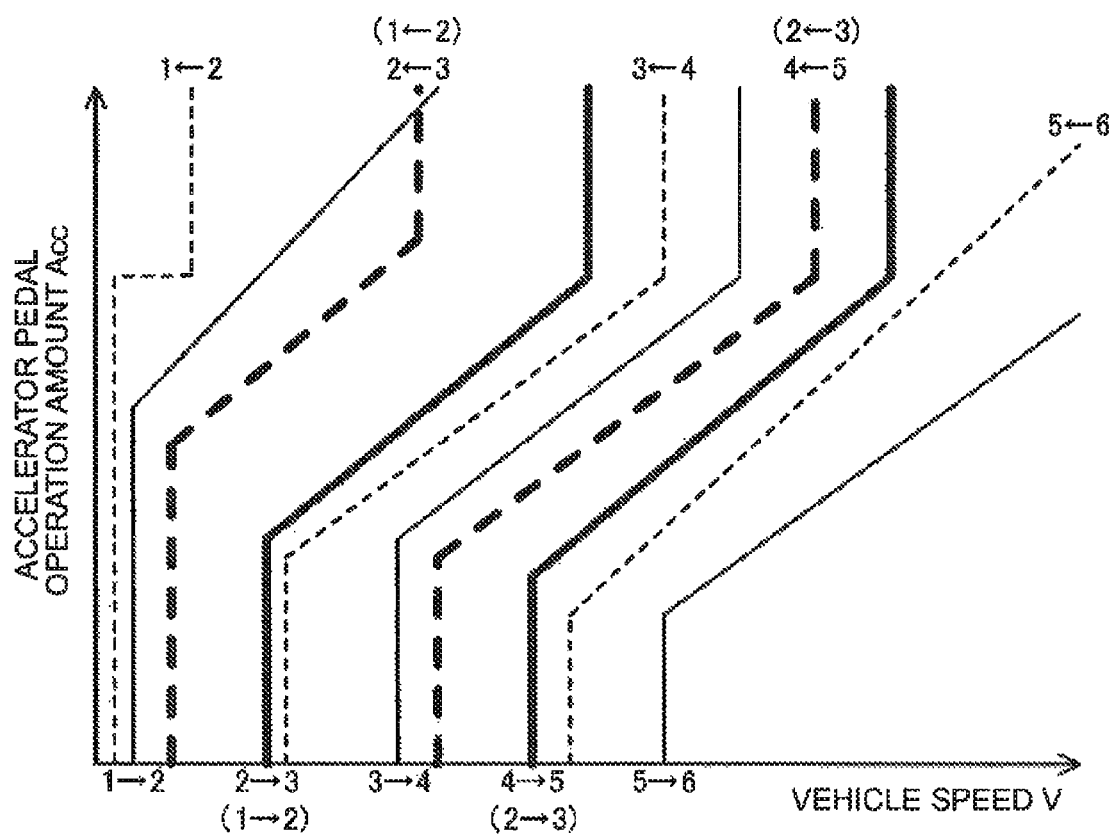
FIG. 13 is an explanatory chart that shows one example of a gear change chart that is used in the second example.

The transmission 130, which is provided in the hybrid vehicle 120 of the second example, is configured as a stepped automatic transmission that has three forward gear stages by hydraulic drive. The gear stage of the transmission 130 is changed by a control signal from the HVECU 70. In the hybrid vehicle 120 of the second example, in addition to the three gear stages of the transmission 130, three virtual gear stages are set. Thus, the hybrid vehicle 120 of the second example functions as if the hybrid vehicle 120 includes a six-speed transmission. FIG. 13 is one example of a gear change chart that is used in the second example. For an easy comparison, the gear change chart in FIG. 13 is set to be the same as the gear change chart in FIG. 6. In FIG. 13, a bold solid line is an upshift line of the transmission 130, and a bold broken line is a downshift line of the transmission 130. A thin solid line is a virtual upshift line, and a thin broken line is a virtual downshift line. In the drawing, numbers and arrows in an upper section and a lower section indicate gear changes at the six gear stages including the virtual gear stages, and numbers and arrows in parentheses in the upper section and the lower section indicate gear changes at the three gear stages of the transmission 130. As shown in the drawing, each one of the virtual gear stages is provided between two each of the gear stages of the transmission 130.

Figure 14:
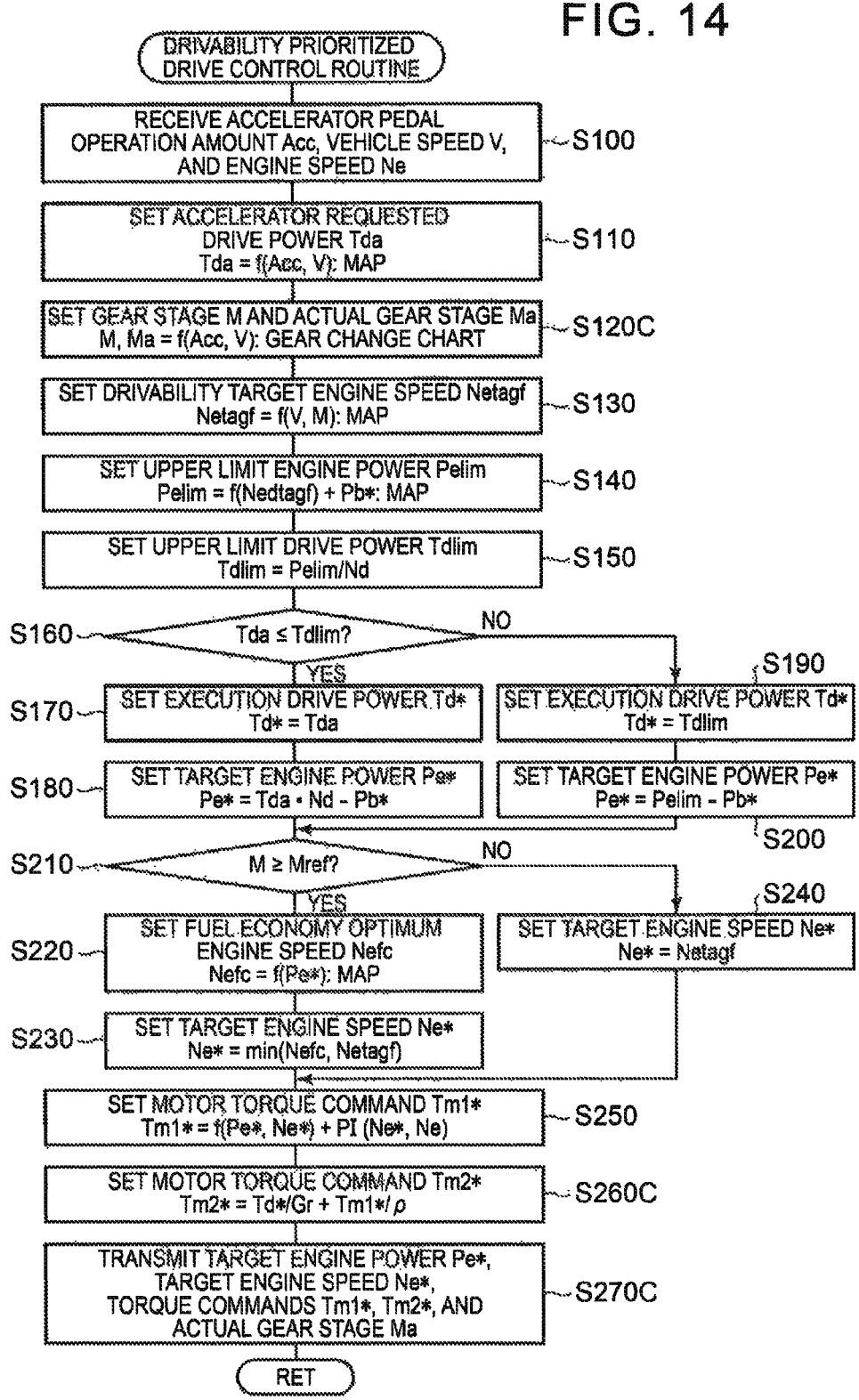
FIG. 14 is a flowchart of one example of a drivability prioritized drive control routine that is executed by the HVECU 70 at a time of the D position in the drive feeling prioritized mode in the second example.

In the hybrid vehicle 120 of the second example, at the time of the D position in the drive feeling prioritized mode, a drivability prioritized drive control routine in FIG. 14 is executed. The drivability prioritized drive control routine in FIG. 14 is the same as the drivability prioritized drive control routine in FIG. 2 except for a point that step S120C of setting not only the gear stage M but also an actual gear stage Ma, step S260C of setting the torque command Tm2* of the motor MG2 by using a gear ratio Gr of the actual gear stage Ma of the transmission 130, and step S270C of transmitting the actual gear stage Ma to the transmission 130 when transmitting the target engine power Pe, the target engine speed Ne*, and the like are provided. Accordingly, the processes in the drivability prioritized drive control routine of FIG. 14 that are the same as the processes in the drivability prioritized drive control routine of FIG. 2 are denoted by the same step numbers. A brief description will hereinafter be centered on the different point of the drivability prioritized drive control routine in FIG. 14 from the drivability prioritized drive control routine in FIG. 2.

When the drivability prioritized drive control routine of FIG. 14 is executed, the HVECU 70 first receives the accelerator pedal operation amount Acc, the vehicle speed V, and the speed Ne of the engine 22 (step S100) and sets the accelerator requested drive power Tda by using the accelerator pedal operation amount Acc, the vehicle speed V, and the accelerator requested drive power setting map in FIG. 3 (step S110). Next, the HVECU 70 sets the gear stage M and the actual gear stage Ma by using the accelerator pedal operation amount Acc, the vehicle speed V, and the gear change chart in FIG. 12 (step S120C). Here, the gear stage M means any of the six gear stages that includes the virtual gear stages, and the actual gear stage Ma means any of the three gear stages of the transmission 130. Accordingly, the gear stage M is set according to a gear stage of the six gear stages to which the gear stage M corresponds on the basis of all gear change lines in FIG. 13, and the actual gear stage Ma is set according to a gear stage of the three gear stages to which the gear stage Ma corresponds on the basis of the bold solid lines and the bold broken lines in FIG. 13.

Figure 8:
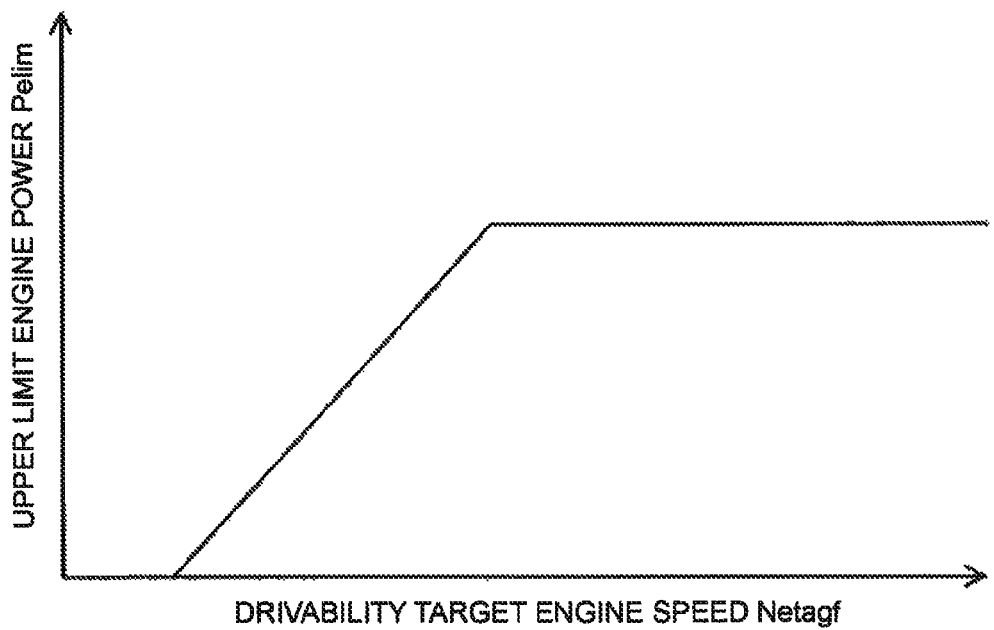
FIG. 8 is an explanatory chart that shows one example of an upper limit engine power setting map.

Next, the HVECU 70 sets the drivability target engine speed Netagf by using the vehicle speed V, the gear stage M, and the drivability target engine speed setting map in FIG. 7 (step S130) and sets the upper limit engine power Pelim by adding the charge/discharge requested power Pb* to the tentative upper limit engine power Pelim that is obtained by using the drivability target engine speed Netagf and the upper limit engine power setting map in FIG. 8 (step S140). Then, the HVECU 70 sets the upper limit drive power Tdlim by dividing the upper limit engine power Pelim by the rotational speed Nd of the driveshaft 36 (step S150) and compares the accelerator requested drive power Tda with the upper limit drive power Tdlim (step S160).

If the accelerator requested drive power Tda is equal to or lower than the upper limit drive power Tdlim, the HVECU 70 sets the accelerator requested drive power Tda as the execution drive power Td* (step S170), and sets the power that is obtained by subtracting the charge/discharge requested power Pb* from the power that is obtained by multiplying the accelerator requested drive power Tda by the rotational speed Nd of the driveshaft 36 as the target engine power Pe* (step S180). If the accelerator requested drive power Tda is higher than the upper limit drive power Tdlim, the HVECU 70 sets the upper limit drive power Tdlim as the execution drive power Td* (step S190), and sets the power that is obtained by subtracting the charge/discharge requested power Pb* from the upper limit engine power Pelim as the target engine power Pe* (step S200).

Next, the HVECU 70 determines whether the gear stage M is equal to or higher than the threshold Mref (step S210). Then, if the gear stage M is equal to or higher than the threshold Mref, the HVECU 70 sets the fuel economy optimum engine speed Nefc by using the target engine power Pe* and the fuel economy optimum engine speed setting map in FIG. 5 (step S220) and sets the lower one of the set fuel economy optimum engine speed Nefc and the drivability target engine speed Netagf as the target engine speed Ne* (step S230). On the other hand, if the gear stage M is lower than the threshold Mref, the HVECU 70 sets the drivability target engine speed Netagf as the target engine speed Ne* (step S240).

Next, the HVECU 70 sets the torque command Tm1* of the motor MG1 by the above-described equation (2) (step S250) and sets the torque command Tm2* of the motor MG2 by the following equation (5) (step S260C). In the equation (5), "Gr" represents a gear ratio of the actual gear stage Ma of the transmission 130. Accordingly, a first term of a right side of the equation (5) means drive power that should be output to an input shaft of the transmission 130 in order to output the execution drive power Td* of the driveshaft 36 as an output shaft of the transmission 130.

$$Tm2^*=Td^*/Gr+Tm1^*/\rho \quad (5)$$

Then, the HVECU 70 transmits the target engine power Pe* and the target engine speed Ne* to the engine ECU 24, transmits the torque commands Tm1*, Tm2* to the motor ECU 40, and transmits the actual gear stage Ma to the transmission 130 (step S270C). Thereafter, this routine is terminated. The transmission 130 that receives the actual gear stage Ma maintains the gear stage when the gear stage at a time of receiving the actual gear stage Ma is the actual gear stage Ma. When the gear stage at the time of receiving the actual gear stage Ma is not the actual gear stage Ma, the transmission 130 changes the gear stage such that the gear stage matches the actual gear stage Ma.

Similar to the first example, in the routine, when the accelerator requested drive power Tda is equal to or lower than the upper limit drive power Tdlim and the gear stage M is lower than the threshold Mref, the HVECU 70 sets the power, by which the accelerator requested drive power Tda is output to the driveshaft 36, as the target engine power Pe*, and sets the drivability target engine speed Netagf as the target engine speed Ne*. In addition, when the accelerator requested drive power Tda is equal to or lower than the upper limit drive power Tdlim and the gear stage M is equal to or higher than the threshold Mref, the HVECU 70 sets the power, by which the accelerator requested drive power Tda is output to the driveshaft 36, as the target engine power Pe* and sets the lower one of the fuel economy optimum engine speed Nefc, at which the target engine power Pe* realizing the optimum fuel economy is output from the engine 22, and the drivability target engine speed Netagf as the target engine speed Ne*. Then, when the accelerator requested drive power Tda is higher than the upper limit drive power Tdlim and the gear stage M is lower than the threshold Mref, the HVECU 70 sets the power, by which the upper limit drive power Tdlim is output to the driveshaft 36, as the target engine power Pe* and sets the drivability target engine speed Netagf as the target engine speed Ne*. In addition, when the accelerator requested drive power Tda is higher than the upper limit drive power Tdlim and the gear stage M is equal to or higher than the threshold Mref, the HVECU 70 sets the power, by which the upper limit drive power Tdlim is output to the driveshaft 36, as the target engine power Pe* and sets the lower one of the fuel economy optimum engine speed Nefc, at which the target engine power Pe* realizing the optimum fuel economy is output from the engine 22, and the drivability target engine speed Netagf as the target engine speed Ne*. Accordingly, in any of these cases, the speed Ne of the engine 22 can be suppressed from becoming higher than the drivability target engine speed Netagf, which is based on the vehicle speed V and the gear stage M.

The hybrid vehicle 120 of the second example that has been described so far functions in a similar manner to the hybrid vehicle 20 of the first example and thus exerts similar effects to effects exerted by the hybrid vehicle 20 of the first example. That is, the hybrid vehicle 120 of the second example exerts such an effect that, even when the driver depresses the accelerator pedal 83, the speed Ne of the engine 22 can correspond to the vehicle speed V and thus the driver can receive the further favorable drive feeling when compared to the case in which the speed Ne of the engine 22 is rapidly increased prior to the increase in the vehicle speed V. The hybrid vehicle 120 of the second example also exerts such an effect that, when the gear stage is changed (shifted), the target engine power Pe* that corresponds to the gear stage M is also changed, and thus the driver can receive the gear change feeling. As the result of these, the hybrid vehicle 120 exerts such an effect that the driver can receive the further favorable drive feeling.

Figure 15:
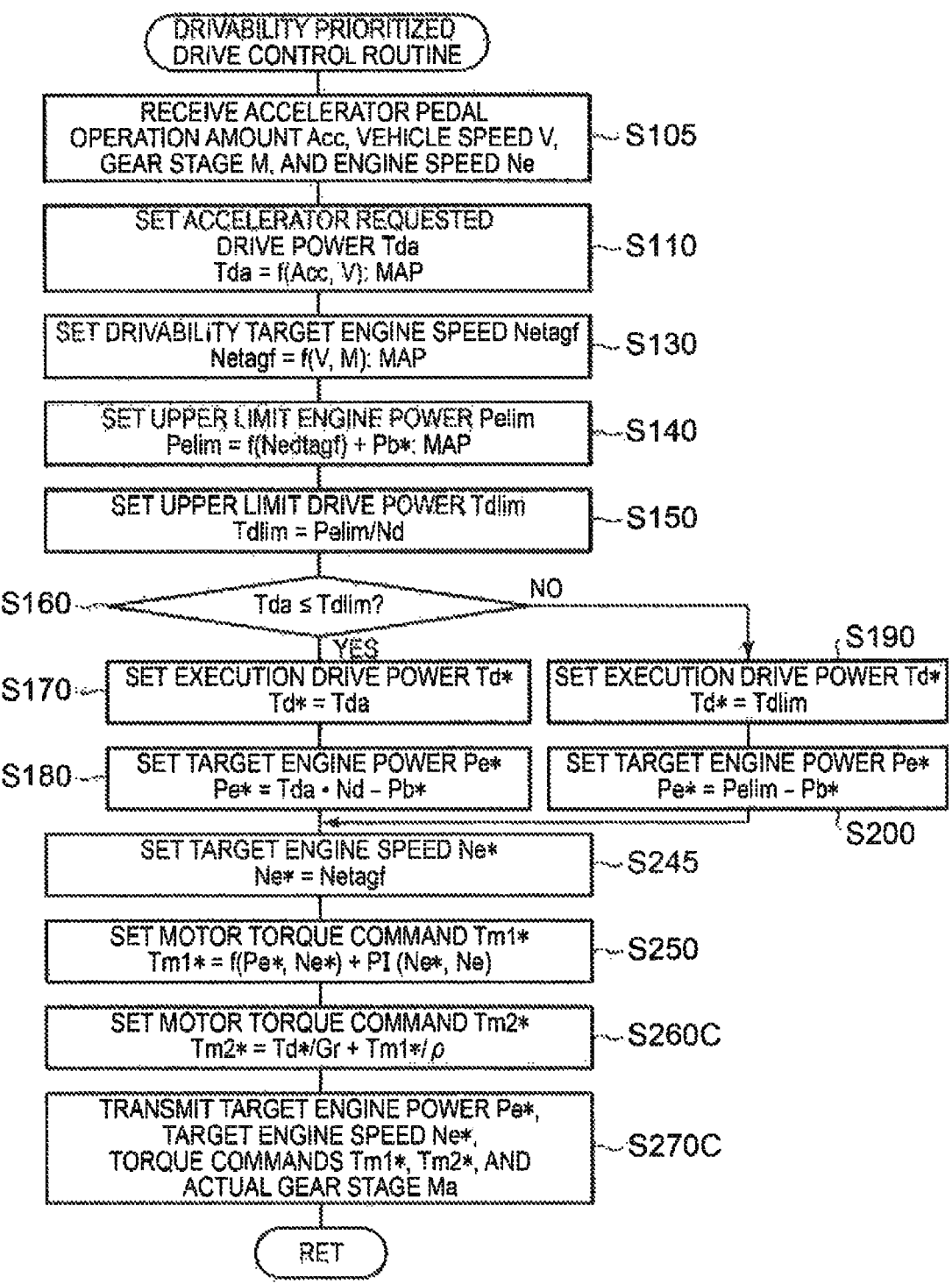
FIG. 15 is a flowchart of one example of a drivability prioritized drive control routine that is executed by the HVECU 70 at a time of the M position in the second example.

Next, a description will be made on an operation at a time when the shift position SP of the hybrid vehicle 120 of the second example is the manual position (M position). In this case, a drivability prioritized drive control routine in FIG. 15 may be executed. The drivability prioritized drive control routine in FIG. 15 is the same as the drivability prioritized drive control routine in FIG. 11 except for a point that step S260C of setting the torque command Tm2* of the motor MG2 by using the gear ratio Gr of the actual gear stage Ma of the transmission 130 and step S270C of transmitting the actual gear stage Ma to the transmission 130 when transmitting the target engine power Pe*, the target engine speed Ne*, and the like are provided. The description 6n such a different point is the same as the description of the drivability prioritized drive control routine in FIG. 14, and thus the description will not be made.

The hybrid vehicle 120 of the second example includes the three-speed transmission 130 and functions to have six gear stages including the virtual gear stages. However, the transmission 130 is not limited to the three-speed transmission, but may be a two-speed transmission, a four-speed transmission, or higher. In addition, the virtual gear stages are provided to correspond to the number of the stages of the transmission. However, the virtual gear stages may be provided in the desired number of stages, such as one stage or two stages, for each of the gear stages of the transmission. Furthermore, the desired number of the virtual gear stages may be provided for the specific gear stage(s) of the transmission. Moreover, the virtual gear stages may not be provided.

A description will be made on corresponding relationships between primary elements of the example and primary elements of the disclosure described in SUMMARY. In the example, the engine 22 corresponds to the "engine", the motor MG1 corresponds to the "first motor", the driveshaft 36 corresponds to the "driveshaft", the planetary gear 30 corresponds to the "planetary gear mechanism", the motor MG2 corresponds to the "second motor", and the battery 50 corresponds to the "battery". In addition, the HVECU 70, the engine ECU 24, and the motor ECU 40 that execute the drive control in the normal drive mode and the drivability prioritized drive control routine in FIG. 2 correspond to the "electronic control unit".

Note that, the example is merely one example that specifically describes a mode for carrying out the disclosure described in SUMMARY, and thus the corresponding relationships between the primary elements of the example and the primary elements of the disclosure described in SUMMARY do not limit the elements of the disclosure described in SUMMARY. That is, the disclosure described in SUMMARY should be interpreted on the basis of the description in SUMMARY, and the example is merely a specific example of the disclosure described in SUMMARY.

The mode for carrying out the disclosure has been described so far by using the examples. However, it is needless to say that the disclosure is not limited to such examples in any respect and can be implemented in various modes within the scope that does not depart from the gist of the disclosure.

The disclosure can be used in manufacturing industry of hybrid vehicles, and the like.

What is claimed is:

1. A hybrid vehicle comprising:
   an engine;
   a first motor;
   a driveshaft coupled to an axle;
   a planetary gear mechanism including three rotation elements, the three rotation elements being respectively connected to three shafts of an output shaft of the engine, a rotational shaft of the first motor, and the driveshaft;
   a second motor configured to input power to the driveshaft and output power from the driveshaft;
   a battery configured to supply electric power to the first motor and the second motor; and
   an electronic control unit configured to set drive power that is output to the driveshaft based on an accelerator pedal operation amount by a driver and a vehicle speed as requested drive power,
   the electronic control unit being configured to control the engine, the first motor, and the second motor so as to travel by using the requested drive power,
   the electronic control unit being configured to set a drivability speed, the drivability speed being a speed of the engine that is based on the accelerator pedal operation amount, the vehicle speed, and a gear stage,
   the electronic control unit being configured to set upper limit power of the engine, the upper limit power being maximum power that is output from the engine when the engine is operated at the drivability speed,
   the electronic control unit being configured to set upper limit drive power of the driveshaft, the upper limit drive power being drive power when the upper limit power is output to the driveshaft,
   the electronic control unit being configured to set target engine power of the engine, the target engine power being power for outputting one of first power and second power to the driveshaft, the first power being lower one of the upper limit drive power and the requested drive power, the second power being lower one of third power and fourth power, the third power being power for outputting the upper limit drive power to the driveshaft, the fourth power being power for outputting the requested drive power to the driveshaft, and
   the electronic control unit being configured to control the engine, the first motor, and the second motor such that the target engine power is output from the engine.

2. The hybrid vehicle according to claim 1, wherein the electronic control unit is configured to control the engine, the first motor, and the second motor such that the first power is output to the driveshaft.

3. The hybrid vehicle according to claim 1, wherein the electronic control unit is configured to:
   set a target speed of the engine, the target speed is set as the drivability speed; and
   control the engine to be operated at the target speed.

4. The hybrid vehicle according to claim 3, wherein the electronic control unit is configured to:
- set lower one of a fuel economy optimum engine speed and the drivability speed as the target speed of the engine when the gear stage is equal to or higher than a threshold, the fuel economy optimum engine speed is a speed at which a fifth power is output from the engine as the fuel economy optimum, the fifth power is power that is based on the requested drive power and the vehicle speed; and
- control the engine to be operated at the target speed.

5. The hybrid vehicle according to claim 1, wherein when charging and discharging requested power is required, the electronic control unit is configured to:
- set power that is obtained by adding the charging and discharging requested power to the maximum power as the upper limit power, the charging and discharging requested power is power to charge and discharge the battery and is power that has a negative value on a charging side,
- set power that is obtained by subtracting the charging and discharging requested power from the upper limit power as the target engine power when the target engine power is set such that the upper limit drive power is output to the driveshaft; and
- set power that is obtained by subtracting the charging and discharging requested power from power for outputting the requested drive power to the driveshaft, as the target engine power when the target engine power is set such that the requested drive power is output to the driveshaft.

6. The hybrid vehicle according to claim 1, wherein when charging and discharging requested power is required, the electronic control unit is configured to:
- set the drive power at a time when the power that is obtained by adding the charging and discharging requested power to the upper limit power is output to the driveshaft as the upper limit drive power, the charging and discharging requested power is power to charge and discharge the battery and is power that has a negative value on a charging side,
- set the upper limit power as the target engine power when the target engine power is set such that the upper limit drive power is output to the driveshaft; and
- set power that is obtained by subtracting the charging and discharging requested power from power for outputting the requested drive power to the driveshaft, as the target engine power when the target engine power is set such that the requested drive power is output to the driveshaft.

7. The hybrid vehicle according to claim 1, further comprising
a mode switching switch configured to instruct whether to select a drive feeling prioritized mode in which drive feeling of the driver is prioritized over the fuel economy, wherein
the electronic control unit is configured to:
- set power of the engine for outputting the requested drive power to the driveshaft, as the target engine power when the drive feeling prioritized mode is not selected by the mode switching switch; and
- control the engine such that the engine is operated at a fuel economy optimum engine speed and the target engine power is output from the engine, the fuel economy optimum engine speed is an engine speed at which the target engine power realizing the optimum fuel economy is output from the engine.

8. The hybrid vehicle according to claim 1, wherein the gear stage is a virtual gear stage that is set based on the accelerator pedal operation amount by the driver and the vehicle speed.

9. The hybrid vehicle according to claim 1, further comprising:
- a stepped transmission that is attached between the driveshaft and the planetary gear mechanism, wherein
- the gear stage is either one of a gear stage of the stepped transmission and a gear stage that is obtained by adding a virtual gear stage set based on the accelerator pedal operation amount by the driver and the vehicle speed to the gear stage of the stepped transmission.

10. A control method for a hybrid vehicle, the hybrid vehicle including:
- an engine;
- a first motor;
- a driveshaft coupled to an axle;
- a planetary gear mechanism including three rotation elements, the three rotation elements being respectively connected to three shafts of an output shaft of the engine, a rotational shaft of the first motor, and the driveshaft;
- a second motor configured to input power to the driveshaft and output power from the driveshaft;
- a battery configured to supply electric power to the first motor and the second motor; and
- an electronic control unit,
the control method comprising:
- setting, by the electronic control unit, drive power that is output to the driveshaft based on an accelerator pedal operation amount by a driver and a vehicle speed as requested drive power;
- controlling, by the electronic control unit, the engine, the first motor, and the second motor so as to travel by using the requested drive power;
- setting, by the electronic control unit, a drivability speed, the drivability speed being a speed of the engine that is based on the accelerator pedal operation amount, the vehicle speed, and a gear stage;
- setting, by the electronic control unit, upper limit power of the engine, the upper limit power being maximum power that is output from the engine when the engine is operated at the drivability speed;
- setting, by the electronic control unit, upper limit drive power of the driveshaft, the upper limit drive power being drive power when the upper limit power is output to the driveshaft;
- setting, by the electronic control unit, target engine power of the engine, the target engine power being power for outputting one of first power and second power to the driveshaft, the first power being lower one of the upper limit drive power and the requested drive power, the second power being lower one of third power and fourth power, the third power being power for outputting the upper limit drive power to the driveshaft, the fourth power being power for outputting the requested drive power to the driveshaft; and
- controlling, by the electronic control unit, the engine, the first motor, and the second motor by the electronic control unit such that the target engine power is output from the engine.

* * * * *